US009430793B2

(12) United States Patent
Murakami

(10) Patent No.: US 9,430,793 B2
(45) Date of Patent: Aug. 30, 2016

(54) DICTIONARY GENERATION DEVICE, DICTIONARY GENERATION METHOD, DICTIONARY GENERATION PROGRAM AND COMPUTER-READABLE RECORDING MEDIUM STORING SAME PROGRAM

(71) Applicant: RAKUTEN, INC., Shinagawa-ku, Tokyo (JP)

(72) Inventor: Koji Murakami, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 274 days.

(21) Appl. No.: 14/371,030

(22) PCT Filed: Feb. 15, 2013

(86) PCT No.: PCT/JP2013/053695
§ 371 (c)(1),
(2) Date: Jul. 8, 2014

(87) PCT Pub. No.: WO2013/122205
PCT Pub. Date: Aug. 22, 2013

(65) Prior Publication Data
US 2015/0012264 A1 Jan. 8, 2015

Related U.S. Application Data

(60) Provisional application No. 61/598,976, filed on Feb. 15, 2012.

(51) Int. Cl.
*G06Q 30/06* (2012.01)
*G06Q 10/10* (2012.01)
(Continued)

(52) U.S. Cl.
CPC ....... *G06Q 30/0623* (2013.01); *G06F 17/2735* (2013.01); *G06F 17/2755* (2013.01); *G06F 17/30598* (2013.01); *G06Q 10/10* (2013.01)

(58) Field of Classification Search
CPC .............. G06F 17/28; G06F 17/2775; G06F 17/2735; G06F 17/21; G06F 17/30734; G06F 17/218; G06F 17/2205; G06F 17/2276; G06F 17/30312; G06Q 30/02; G06Q 30/0278

USPC ........................................................ 704/9, 10
See application file for complete search history.

(56) References Cited

U.S. PATENT DOCUMENTS 5,794,050 A * 8/1998 Dahlgren .............. G06F 17/271
707/E17.074
6,260,008 B1 * 7/2001 Sanfilippo ............. G06F 17/274
704/9

(Continued)

FOREIGN PATENT DOCUMENTS

| JP | 2007-264747 A | 10/2007 |
|---|---|---|
| JP | 4828653 B1 | 9/2011 |
| WO | 2005/041099 A1 | 5/2005 |

OTHER PUBLICATIONS

English Translation of International Preliminary Report on Patentability dated Aug. 28, 2014 issued in Application No. PCT/JP2013/053695.

(Continued)

*Primary Examiner* — Edgar Guerra-Erazo
(74) *Attorney, Agent, or Firm* — Sughrue Mion, PLLC

(57) ABSTRACT

A dictionary generation device according to one embodiment includes a determination unit configured to (A) refer to an item database that stores a plurality of records containing an item name/item description including a noun sequence, an item category, and a shop selling the item as fields and determine whether the noun sequence included in the item name/item description of each record is set corresponding to the item category, (B) count the number of selling shops in a record containing the noun sequence for each item category and calculate a shop intensity of each noun sequence based on the counted number of selling shops, (C) determine whether one item category uniquely derived from the noun sequence exists based on the shop intensity for each item category, and (D) determine the noun sequence as a definitive category word when the one item category exists.

19 Claims, 22 Drawing Sheets

(51) Int. Cl.
*G06F 17/27* (2006.01)
*G06F 17/30* (2006.01)

(56) References Cited

U.S. PATENT DOCUMENTS

| | | | | |
|---|---|---|---|---|
| 6,446,061 | B1* | 9/2002 | Doerre | G06F 17/3071 707/738 |
| 6,871,174 | B1* | 3/2005 | Dolan | G06F 17/30684 704/9 |
| 7,526,425 | B2* | 4/2009 | Marchisio | G06F 17/30672 704/9 |
| 7,676,462 | B2* | 3/2010 | Kirkland | G06F 17/3064 707/999.005 |
| 7,752,196 | B2* | 7/2010 | Rogers | G06F 17/2705 707/716 |
| 7,752,243 | B2* | 7/2010 | Hoeber | G06F 17/3064 707/706 |
| 8,126,890 | B2* | 2/2012 | Bobick | G06F 17/30731 704/9 |
| 2002/0059289 | A1* | 5/2002 | Wenegrat | G06F 17/30734 |
| 2003/0018626 | A1* | 1/2003 | Kay | G06Q 20/102 |
| 2003/0061028 | A1* | 3/2003 | Dey | G06F 17/30017 704/9 |
| 2003/0084066 | A1* | 5/2003 | Waterman | G06F 17/30707 |
| 2003/0217335 | A1* | 11/2003 | Chung | G06F 17/2785 715/206 |
| 2004/0054672 | A1* | 3/2004 | Tsuchitani | G06F 17/30864 |
| 2004/0153311 | A1* | 8/2004 | Liu | G06F 17/2735 704/10 |
| 2005/0165600 | A1* | 7/2005 | Kasravi | G06F 17/2211 704/9 |
| 2005/0198026 | A1* | 9/2005 | Dehlinger | G06F 17/2881 |
| 2006/0074632 | A1* | 4/2006 | Nanavati | G06F 17/2785 704/9 |
| 2006/0155693 | A1* | 7/2006 | Chowdhury | G06F 17/30675 |
| 2007/0106499 | A1* | 5/2007 | Dahlgren | G06F 17/30401 704/10 |
| 2010/0076979 | A1* | 3/2010 | Wang | G06F 17/30864 707/740 |
| 2012/0143598 | A1 | 6/2012 | Bandara | |

OTHER PUBLICATIONS

International Search Report of PCT/JP2013/053695, dated Apr. 9, 2013.

* cited by examiner

Fig. 2

| SHOP ID | SHOP NAME | SHOP CATEGORY | ADDRESS | SHOP URL |
|---|---|---|---|---|
| S001 | SHOP AB | LIQUORS | ... | ... |
| S002 | SHOP BC | HOME APPLIANCES | ... | ... |
| S003 | ... | ... | ... | ... |
| S004 | ... | ... | ... | ... |

| SHOP ID | ITEM ID | ITEM NAME | PRICE | ITEM URL | QUANTITY OF STOCK | ITEM CATEGORY |
|---|---|---|---|---|---|---|
| S001 | T001 | SAKE AA, FREE SHIPPING | ¥5000 | ... | ... | FOOD>SAKE, SHOCHU |
| | T002 | BEER BB, FREE SHIPPING | ¥1000 | ... | ... | FOOD>SAKE, SHOCHU |
| | T003 | WATER CC, FREE SHIPPING | ¥1200 | ... | ... | FOOD>SAKE, SHOCHU |
| | T004 | ... | ... | ... | ... | ... |
| | ... | ... | ... | ... | ... | ... |
| S002 | T101 | SAKE AA, FREE SHIPPING | ¥4900 | ... | ... | FOOD>SAKE, SHOCHU |
| | T102 | WATER CC, FREE SHIPPING | ¥1200 | ... | ... | FOOD>SOFT DRINKS |
| | ... | ... | ... | ... | ... | ... |
| ... | ... | | | | | |

22

| DEFINITIVE CATEGORY WORD | ITEM CATEGORY |
|---|---|
| SAKE AA | FOOD>SAKE, SHOCHU |
| BEER BB | FOOD>BEER, WINES AND SPIRITS |
| ... | ... |
| ... | ... |

| SHOP CATEGORY | DEFINITIVE CATEGORY WORD | ITEM CATEGORY |
|---|---|---|
| LIQUORS | SAKE AA | FOOD>SAKE, SHOCHU |
| | BEER BB | FOOD>BEER, WINES AND SPIRITS |
| | ... | ... |
| DAILY ITEMS | BOOTS | DIY>GARDEN, DIY |
| | ... | ... |
| FASHION | BOOTS | FASHION>SHOES |
| | ... | ... |
| ... | ... | ... |

23

(b)

| SHOP ID | DEFINITIVE CATEGORY WORD | ITEM CATEGORY |
|---|---|---|
| S001 | SAKE AA | FOOD>SAKE, SHOCHU |
| | BEER BB | FOOD>BEER, WINES AND SPIRITS |
| | ... | ... |
| S101 | BOOTS | DIY>GARDEN, DIY |
| | ... | ... |
| S201 | BOOTS | FASHION>SHOES |
| | ... | ... |
| ... | ... | ... |

| WORD (NOUN SEQUENCE) | ITEM CATEGORY/TYPE |
|---|---|
| MODEL X | TYPE 2 DEFINITIVE CATEGORY WORD OF ITEM CATEGORY A |
| ACCESSORY | REFERENCE WORD OF ITEM CATEGORY B |
| | REFERENCE WORD OF ITEM CATEGORY B |
| | REFERENCE WORD OF ITEM CATEGORY C |
| | REFERENCE WORD OF ITEM CATEGORY D |
| | REFERENCE WORD OF ITEM CATEGORY E |
| | REFERENCE WORD OF ITEM CATEGORY F |
| | REFERENCE WORD OF ITEM CATEGORY G |
| SCREWDRIVER | TYPE 1 DEFINITIVE CATEGORY WORD OF ITEM CATEGORY D |
| DRIVER | TYPE 2 DEFINITIVE CATEGORY WORD OF ITEM CATEGORY L |
| | TYPE 2 DEFINITIVE CATEGORY WORD OF ITEM CATEGORY M |
| CUTE | UNNECESSARY WORD |
| ... | ... |

DICTIONARY GENERATION DEVICE, DICTIONARY GENERATION METHOD, DICTIONARY GENERATION PROGRAM AND COMPUTER-READABLE RECORDING MEDIUM STORING SAME PROGRAM

CROSS REFERENCE TO RELATED APPLICATIONS

This application is a National Stage of International Application No. PCT/JP2013/053695 filed Feb. 15, 2013, claiming priority based on U.S. Provisional Patent Application No. 61/598,976, filed Feb. 15, 2012, the contents of all of which are incorporated herein by reference in their entirety.

TECHNICAL FIELD

One embodiment of the present invention relates to a device, a method, a program and a recording medium for generating a dictionary to be used for determination of item categories.

BACKGROUND ART

In a so-called virtual shopping mall where many virtual shops open through the Internet, an item category (which is also referred to hereinafter simply as "category") is often assigned to an item available in each shop. By sorting items into item categories, a manager of the virtual shopping mall can systematically manage an enormous amount of items that are put into stock by the respective shops based on their original sales plan, and further a user can search items of different shops at a time using a category and compare them. For example, a commodity transaction system disclosed in the following Patent Literature 1 has a plurality of search databases corresponding to a plurality of categories representing the types of items. In this system, with each search database corresponding to each category, specification information of items in the category and everyday life words representing the features of the items are associated.

CITATION LIST

Patent Literature

PTL 1: JP 2007-264747 A

SUMMARY OF INVENTION

Technical Problem

An association between an item and a category is often made in a shop; however, there is a case where a shop staff assigns a wrong category to an item. Then, item information contains a mistake, which causes a decrease in search accuracy, such as failing to extract an item that should be extracted when a user searches for a certain item based on the category. As a result, not only a shop loses an opportunity to sell the item, but also there is a possibility that the usability of item information in the entire virtual shopping mall decreases significantly due to several repeated wrong category registration.

One approach to improve such a situation is to prepare a dictionary about appropriate categories, which are item categories to be registered for items, determine whether a registered item category is appropriate or not by reference to the dictionary and modify the category according to need. However, because there are a wide variety of items and item categories, it is not easy to generate such a dictionary manually.

It is thus demanded to easily generate a dictionary to be used for determination of item categories.

Solution to Problem

A dictionary generation device according to one aspect of the present invention includes a determination unit configured to (A) refer to an item database that stores a plurality of records containing an item name and/or item description including a noun, a noun phrase or a noun sequence being a sequence of nouns or noun phrases, an item category, and a shop selling the item as fields and determine whether the noun sequence included in the item name and/or item description of each record is set corresponding to the item category, (B) count the number of selling shops in a record containing the noun sequence set corresponding to the item category for each item category and calculate a shop intensity of each noun sequence set corresponding to the item category based on the counted number of selling shops, (C) determine whether one item category uniquely derived from the noun sequence exists based on the shop intensity for each item category, and (D) determine the noun sequence as a definitive category word when the one item category exists; and a registration unit configured to store dictionary information where the definitive category word and the uniquely derived item category are associated with each other into a dictionary database.

A dictionary generation method according to one aspect of the present invention includes a determination step of (A) referring to an item database that stores a plurality of records containing an item name and/or item description including a noun, a noun phrase or a noun sequence being a sequence of nouns or noun phrases, an item category, and a shop selling the item as fields and determining whether the noun sequence included in the item name and/or item description of each record is set corresponding to the item category, (B) counting the number of selling shops in a record containing the noun sequence set corresponding to the item category for each item category and calculating a shop intensity of each noun sequence set corresponding to the item category based on the counted number of selling shops, (C) determining whether one item category uniquely derived from the noun sequence exists based on the shop intensity for each item category, and (D) determining the noun sequence as a definitive category word when the one item category exists; and a registration step of storing dictionary information where the definitive category word and the uniquely derived item category are associated with each other into a dictionary database.

A dictionary generation program according to one aspect of the present invention causes a computer to implement a determination unit configured to (A) refer to an item database that stores a plurality of records containing an item name and/or item description including a noun, a noun phrase or a noun sequence being a sequence of nouns or noun phrases, an item category, and a shop selling the item as fields and determine whether the noun sequence included in the item name and/or item description of each record is set corresponding to the item category, (B) count the number of selling shops in a record containing the noun sequence set corresponding to the item category for each item category and calculate a shop intensity of each noun sequence set corresponding to the item category based on the counted number of selling shops, (C) determine whether one item category uniquely derived from the noun sequence exists based on the shop intensity for each item category, and (D) determine the noun sequence as a definitive category word when the one item category exists; and a registration unit configured to store dictionary information where the definitive category word and the uniquely derived item category are associated with each other into a dictionary database.

A computer-readable recording medium according to one aspect of the present invention stores a dictionary generation program causing a computer to implement a determination unit configured to (A) refer to an item database that stores a plurality of records containing an item name and/or item description including a noun, a noun phrase or a noun sequence being a sequence of nouns or noun phrases, an item category, and a shop selling the item as fields and determine whether the noun sequence included in the item name and/or item description of each record is set corresponding to the item category, (B) count the number of selling shops in a record containing the noun sequence set corresponding to the item category for each item category and calculate a shop intensity of each noun sequence set corresponding to the item category based on the counted number of selling shops, (C) determine whether one item category uniquely derived from the noun sequence exists based on the shop intensity for each item category, and (D) determine the noun sequence as a definitive category word when the one item category exists; and a registration unit configured to store dictionary information where the definitive category word and the uniquely derived item category are associated with each other into a dictionary database.

According to the above aspects, one or more item categories are specified from an item name and/or item description including a noun, a noun phrase or a noun sequence being a sequence of nouns or noun phrases, and the number of shops is calculated for each of the item categories. Then, for each item category, an index indicating how many shops have registered the item category, which is the shop intensity, is calculated based on the number of shops for each category. Based on this intensity, the definitive category word that uniquely derives one item category is determined, and the definitive category word and the item category are registered as dictionary information into the dictionary database. In this manner, by generating the dictionary information focusing on the fact that how many shops have registered which item categories (shop intensity) for the item information related to one certain word (a noun, a noun phrase or a noun sequence being a sequence of those, which is hereinafter referred to simply as "noun sequence"), it is possible to easily generate the dictionary information to be used for determination of item categories.

In the dictionary generation device according to another aspect, the determination unit may calculate the number of appearances of the noun sequence for each item category, calculate a noun sequence intensity for each item category based on the number of appearances, and determine whether one item category uniquely derived from the noun sequence exists based on the shop intensity and the noun sequence intensity for each item category. In this case, by focusing also on the noun sequence intensity for each item category, the accuracy of the dictionary information can be further improved.

In the dictionary generation device according to another aspect, the determination unit may calculate the number of items corresponding to each item category, calculate an item intensity for each item category based on the number of items, and determine whether one item category uniquely derived from the noun sequence exists based on the shop intensity and the item intensity for each item category. In this case, by focusing also on the item intensity for each item category, the accuracy of the dictionary information can be further improved.

In the dictionary generation device according to another aspect, the determination unit may calculate a total number of shops having registered item information where the item name includes the noun sequence, and when the total number of shops is equal to or less than a specified threshold, not determine the noun sequence as the definitive category word. Because a noun sequence can be treated as the definitive category word only when the noun sequence is used by a certain number of shops, the accuracy of the dictionary information can be further improved.

In the dictionary generation device according to another aspect, the determination unit may refer to an unnecessary words dictionary that stores unnecessary words, and when the noun sequence coincides with the unnecessary word, not determine the noun sequence as the definitive category word. In this manner, by excluding the noun sequence that is not necessary to be registered as the definitive category word, the accuracy of the dictionary information can be further improved.

In the dictionary generation device according to another aspect, the determination unit may specify an item category with the highest shop intensity as a major category and specify an item category with a lower shop intensity than the major category as a minor category, calculate an overlap degree of words between item names of the minor category and item names of the major category, and when the overlap degree is equal to or higher than a specified threshold, determine that the major category is the item category uniquely derived from the noun sequence. In this manner, by determining whether the major category can be associated with the definitive category word by focusing on the overlap degree of words between the major category and the minor category, the accuracy of the dictionary information can be further improved.

In the dictionary generation device according to another aspect, when the overlap degree is equal to or higher than the specified threshold in N-th hierarchical level of the major category and the minor category, the determination unit may determine that the N-th hierarchical level of the major category is uniquely derived from the noun sequence, and then repeat the specification of the major category and the minor category, the calculation of the overlap degree and the determination based on the overlap degree in (N+1)th hierarchical level of the major category, where N is 1 or more. In this case, because the item category to be associated with the definitive category word is searched by defining the major category in each hierarchical level sequentially from the top of the category tree, the item category can be accurately specified.

The dictionary generation device according to another aspect may further include an update unit configured to update an item category in the item information where an item name includes the definitive category word indicated by the dictionary information to an item category indicated by the dictionary information, and after the item information is updated by the update unit, processing by the determination unit, the registration unit and the update unit may be performed repeatedly, and the determination unit may determine whether one item category uniquely derived from the noun sequence exists based on the shop intensity by setting a threshold for the shop intensity to be lower than a value used in the previous determination. In this case, processing of updating the item category in the item information to the appropriate one using the generated dictionary information is repeated by gradually reducing the threshold for the shop intensity. In this manner, by repeating the processing of generating the dictionary information and organizing the item information sequentially from the most reliable definitive category word, the accuracy of the dictionary information can be further improved.

In the dictionary generation device according to another aspect, the determination unit may extract the noun sequence from the item name by morphological analysis. The noun sequence can be thereby extracted without preparing a special rule or dictionary.

In the dictionary generation device according to another aspect, the determination unit may extract the noun sequence from the item name by reference to a rule dictionary that stores a description rule of item names indicating an extraction range of the noun sequence. By using the rule dictionary in this manner, the noun sequence can be easily extracted.

In the dictionary generation device according to another aspect, the determination unit may extract words different from unnecessary words from the item name by reference to an unnecessary words dictionary that stores unnecessary words, and extract the noun sequence from the extracted words. By using the unnecessary words dictionary in this manner, the noun sequence can be easily extracted.

In the dictionary generation device according to another aspect, the registration unit stores recommendation information where the noun sequence and an item category different from the uniquely derived item category among the item categories are associated with each other into another dictionary database. In this manner, by registering the item categories that are likely to be associated with the noun sequence as recommendation information separately from the dictionary information, the choice of the item categories can increase.

In the dictionary generation device according to another aspect, the determination unit may determine whether one item category uniquely derived from a pair of the noun sequence and a shop or a shop category exists based on the shop intensity for each item category, and determine the noun sequence as the definitive category word when the one item category exists, and the registration unit may store dictionary information where the definitive category word, the shop or the shop category and the uniquely derived item category are associated with one another into the dictionary database. The dictionary information can be thereby set in consideration of the characteristics of shops.

In the dictionary generation device according to another aspect, the determination unit may extract the noun sequence from the item name by reference to a notation dictionary that stores information about notational variants. The dictionary information can be thereby generated by accommodating the notational variants.

In the dictionary generation device according to another aspect, when there is only one item category where the shop intensity is higher than a first threshold, the determination unit may determine that one item category uniquely derived from the noun sequence exists and determines the noun sequence as a Type 1 definitive category word of the item category, when there are a plurality of item categories where the shop intensity is higher than the first threshold, the determination unit may determine the noun sequence as a Type 2 definitive category word with less definitiveness of the item category than the Type 1 definitive category word or a reference word with less definitiveness of the item category than the Type 2 definitive category word for each of the plurality of item categories, and the registration unit may store dictionary information where the Type 1 definitive category word, the Type 2 definitive category word or the reference word and the item category are associated with each other into the dictionary database. In this case, because a noun sequence can be classified into the Type 1 and Type 2 definitive category words and the reference word, more detailed dictionary information can be generated.

In the dictionary generation device according to another aspect, when the number of item categories where the shop intensity is higher than the first threshold is not 1, the determination unit may determine whether the number of registration shops of the noun sequence in remaining categories excluding the item category is larger than a second threshold, and when the number of registration shops is larger than the second threshold, the determination unit may determine the noun sequence as an unnecessary word, and the registration unit may store the unnecessary word into a specified database. In this case, the noun sequence can be registered also as the unnecessary word.

In the dictionary generation device according to another aspect, the registration unit may extract a word corresponding to the definitive category word by reference to a notation dictionary that stores information about notational variants, and store dictionary information where the definitive category word, the corresponding word and the uniquely derived item category are associated with one another into the dictionary database. The dictionary information can be thereby generated by accommodating the notational variants.

Advantageous Effects of Invention

According to one aspect of the present invention, it is possible to easily generate a dictionary to be used for determination of item categories.

BRIEF DESCRIPTION OF DRAWINGS

FIG. 2 is a diagram showing an example of shop information.

FIG. 3 is a diagram showing an example of item information.

FIGS. 9(*a*) and 9(*b*) are diagrams showing other examples of dictionary information (definitive category words dictionary).

FIG. 22 is a diagram showing an example of dictionary information (definitive category words dictionary) according to the seventh embodiment.

DESCRIPTION OF EMBODIMENTS

Figure 1:
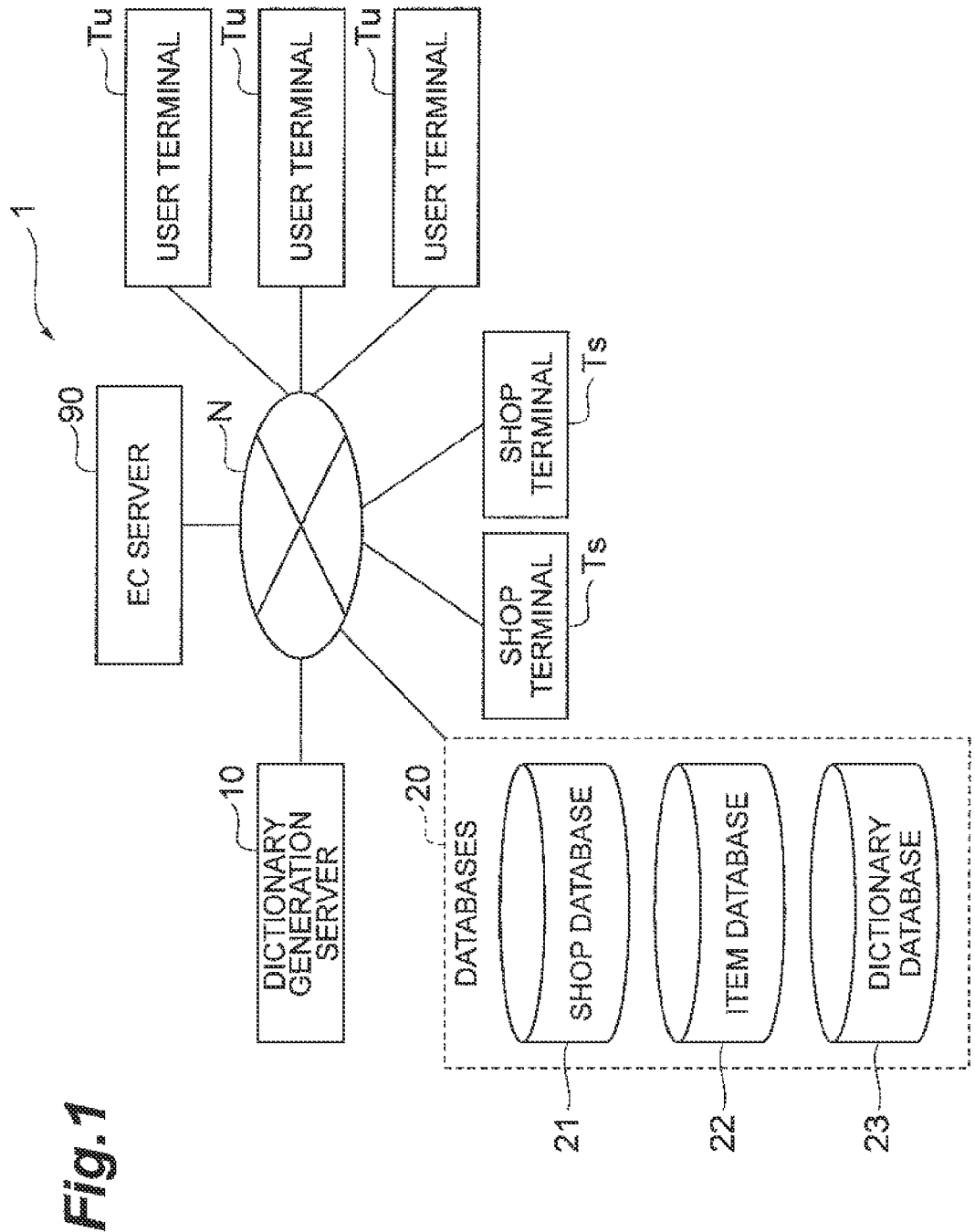
FIG. 1 is a diagram showing an overall configuration of an electronic commerce (EC) system according to an embodiment.

Embodiments of the present invention will be described with reference to the drawings. Note that, in the description of the drawings, the same elements will be denoted by the same reference symbols and redundant description will be omitted.

(First Embodiment)

The functions and configuration of a dictionary generation server (dictionary generation device) according to a first embodiment are described first with reference to FIGS. 1 to 6. The dictionary generation server 10 is a computer that manages a dictionary database 23 used in an electronic commerce (EC) system 1.

The EC system 1 is a computer system that provides a web site (EC site) of a virtual shopping mall where many virtual shops open to users (consumers). A user can search for an item and perform a purchase procedure through the site. A shop manager registers items to be sold with a virtual shop of the virtual shopping mall, and delivers an item purchased by a user to the user. Note that the variety of items is not particularly limited, and it may be an arbitrary tangible object or a non-tangible object such as a service. In addition to the dictionary generation server 10, the EC system 1 includes an EC server 90, databases 20, terminals of respective shop managers, which are shop terminals Ts, and a large number of user terminals Tu. Those devices are connected with one another through a communication network N.

The EC server 90 is a computer system that administers the EC site. The EC server 90 performs provision of various web pages including a main page and an item page, item search, purchase processing (including addition and deletion of a registered item based on input from the shop terminal Ts, provision of a payment means, award of points to users etc.) in response to a request from the user terminal Tu. Further, the EC server 90 performs item information update processing (such as registration and deletion of items, addition of a stock etc.) in response to a request from the shop terminal Ts.

The databases 30 are a group of various kinds of databases required in the EC system 1.

The shop terminal Ts is a computer owned by a manager of a shop joining a virtual shopping mall. The variety of the shop terminal Ts is not particularly limited, and it may be a stationary or portable personal computer, or a mobile terminal such as an advanced mobile phone (smart phone), a cellular phone or a personal digital assistant (PDA), for example. The number of shop terminals Ts in the EC system 1 is not limited.

The user terminal Tu is a computer owned by a user (consumer). Just like the shop terminal Ts, the variety of the user terminal Tu is not particularly limited, and it may be a stationary or portable personal computer, or a mobile terminal such as an advanced mobile phone (smart phone), a cellular phone or a personal digital assistant (PDA), for example. The number of user terminals Tu in the EC system 1 is also not limited.

On the assumption of the above, the dictionary generation server 10 is described hereinafter in detail. First, various databases that are accessed by the dictionary generation server 10 are described in detail.

A shop database 21 is a means of storing shop information related to each virtual shop in the virtual shopping mall. The shop information contains a shop ID that uniquely identifies a shop and attribute information that indicates various attributes of the shop. The attribute information contains the shop name, address, category and URL, though information contained in the attribute information is not limited. FIG. 2 shows an example of the shop information. In the example of FIG. 2, the shop with the shop ID "S001" is "Shop AB", and the category of this shop is "Liquors". Note that the shop category may be managed systematically in a tree structure.

An item database 22 is a means of storing item information related to items that are sold by each virtual shop. The item information contains a shop ID of a shop that offers the item (a shop selling the item), an item ID that uniquely identifies the item and attribute information that indicates various attributes of the item. The attribute information contains the shop name, price, URL, stock quantity and category, though information contained in the attribute information is not limited. The item category is a concept that represents the classification of items. The item information is initially registered, updated or deleted based on an instruction transmitted from the shop terminal Ts. The item name is a title appearing in an item name field of an item page (a web page on which the item information is shown), rather than the proper name or the common name of the item, and it contains a word common to a different varieties of items (for example, a brand name, a manufacturer name, a sales message such as "free shipping" etc.) as well.

FIG. 3 shows an example of item information. The item category is an item category that is entered and registered by a shop. In this example, the item "Beer BB" with the item ID "T002" is associated with the shop ID "S001", and the item category of this item is indicated as "Food>Sake, Shochu". Note that the item category is systematically managed in a tree structure, and "Food>Sake, Shochu"

represents the second hierarchical level "Sake, Shochu" under the first hierarchical level "Food".

In this embodiment, each shop sets not only the price of an item but also the item ID and the registration category on one's own terms, and therefore different item IDs and different registration categories can be assigned to the same item by different shops. In the example of FIG. 3, while the item ID of the item "Sake AA" is "T001" in the shop "S001", it is "T101" in the shop "S002". Further, for the item "Water CC", both of the item ID and the registration category are different between the shops "S001" and "S002".

In this manner, under the situation where all shops are not forced to use a common item ID and a common item category, it is effective to provide consistency in the item category in the EC site by determining a correct item category using a definitive category words dictionary, which is described later. Even if an item ID is common to all shops (for example, even when an item ID common to all shops is set based on a barcode such as the JAN code), category determination using the definitive category words dictionary is still effective as long as each shop can freely set an item category.

A dictionary database 23 is a means of storing a definitive category words dictionary that can be used for registration of item categories and the like. The definitive category words dictionary is a set of dictionary information in which definitive category words (DCW) and item categories are associated with each other, and the definitive category word is a word that uniquely identifies one item category. For example, the proper noun of an item, a combination of a manufacturer name and the proper noun of an item, the common noun of goods, a sequence of common nouns and the like can be set as the definitive category words. The dictionary generation server 10 generates the definitive category words dictionary.

Figure 4:
FIG. 4 is a diagram showing an example of dictionary information (definitive category words dictionary).

FIG. 4 shows an example of the definitive category words dictionary. In this example, only one item category "Food>Sake, Shochu" is associated with the definitive category word "Sake AA", and only one item category "Food>Beer, Wines and Spirits" is associated with the definitive category word "Beer BB". Note that the item category associated with the definitive category word may be a leaf category that is at the end of the category tree or a top or intermediate level category.

The structures of the shop database 21 (shop information), the item database 22 (item information) and the dictionary database 23 (dictionary information) are not limited to those shown in FIGS. 2 to 4, and each database may be normalized or made redundant by an arbitrary policy.

Note that the databases 20 include a user database that stores user information (member information), a purchase history databases that stores purchase histories of users and the like; however, those databases that are not directly related to generation of the definitive category words dictionary are not described in detail.

Figure 5:
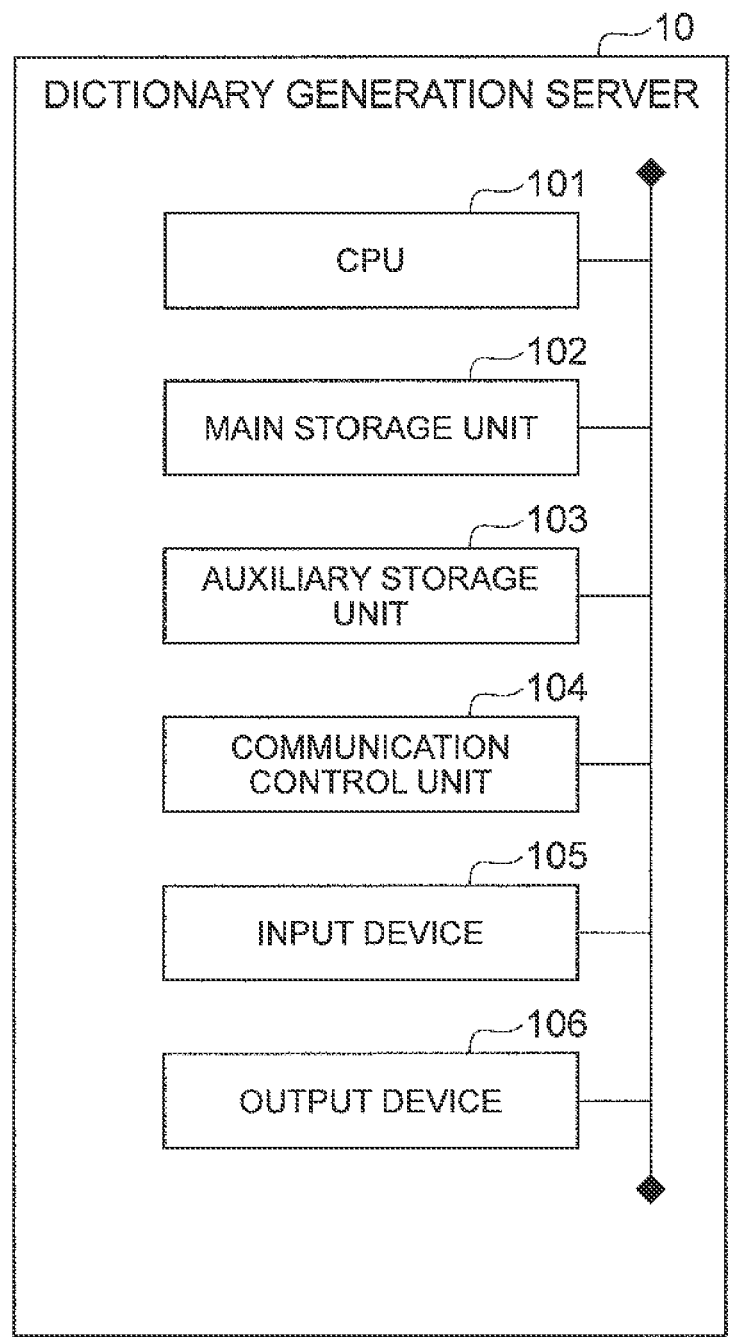
FIG. 5 is a diagram showing a hardware configuration of a dictionary generation server according to an embodiment.

The functions and configuration of the dictionary generation server 10 are described hereinafter. FIG. 5 shows a hardware configuration of the dictionary generation server 10. As shown therein, the dictionary generation server 10 includes a CPU 101 that executes an operating system, an application program and the like, a main storage unit 102 such as ROM and RAM, an auxiliary storage unit 103 such as a hard disk, a communication control unit 104 such as a network card, an input device 105 such as a keyboard and a mouse, and an output device 106 such as a display.

The functional components of the dictionary generation server 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and database required for processing are stored in the main storage unit 102 or the auxiliary storage unit 103. Note that, although the dictionary generation server 10 is composed of one computer in the example of FIG. 5, the functions of the dictionary generation server 10 may be distributed among a plurality of computers.

Figure 6:
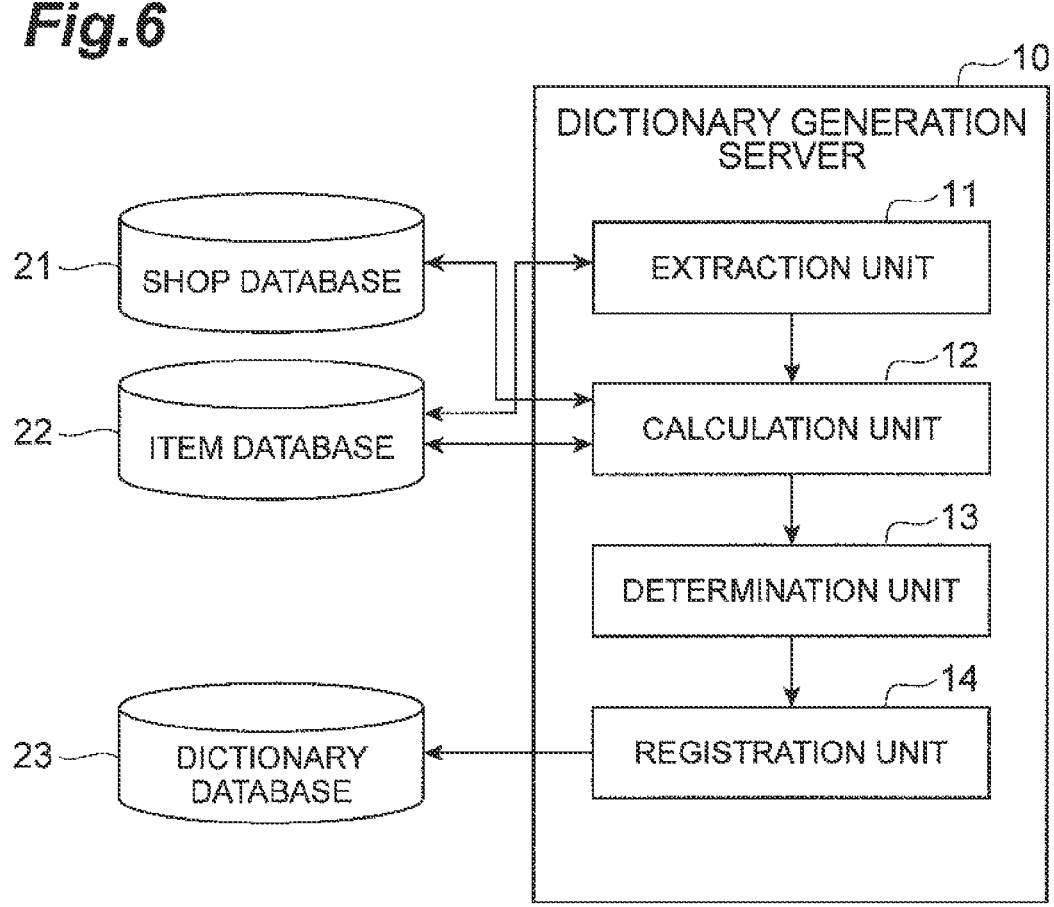
FIG. 6 is a block diagram showing a functional configuration of a dictionary generation server according to first and second embodiments.

As shown in FIG. 6, the dictionary generation server 10 includes an extraction unit 11, a calculation unit 12, a determination unit 13 and a registration unit 14 as functional components.

The extraction unit 11 is a means of extracting one noun, one noun phrase, or a plurality of nouns or noun phrases arranged sequentially (a sequence of nouns or noun phrases) as "noun sequence" from item names of the item information stored in the item database 22. The noun sequence is a candidate for the definitive category word. Note that, although it is assumed that the noun sequence is extracted from item names in following description, the noun sequence may be extracted from information (for example, item description) other than item names in the item information.

A method of extracting a noun sequence is not limited. For example, the extraction unit 11 may extract a noun sequence from item names using morphological analysis. The noun sequence can be thereby extracted without preparing a special rule or dictionary. If the sales information such as a sales message that is not suitable for a noun sequence to be extracted is associated as meta information with a word that makes up an item name, the extraction unit 11 may eliminate the meta information and select only the noun sequence. For example, the sales message such as "free shipping" is not suitable for the definitive category word because it is included in various item names in various categories, and if such a sales message can be distinguished by the meta information, the extraction unit 11 extracts only the noun sequence other than the sales message.

As another method, on the assumption that item names are described under a specified rule, the extraction unit 11 may extract a noun sequence according to the rule. In this case, the extraction unit 11 stores information indicating the rule as a rule dictionary in advance. For example, assuming that the item name description rule (or extraction rule) is "(brand name)+(a character string to be extracted)+(another character string to be eliminated)", if the item name to be processed is "Brand X Beer BB Free shipping", the extraction unit 11 extracts the "Beer BB" as a noun sequence from item names based on the rule. By using the rule dictionary in this manner, it is possible to easily extract a noun sequence.

The extraction unit 11 outputs data of all the extracted noun sequences to the calculation unit 12.

The calculation unit 12 is a means of reading the item information in which noun sequences are included in item names from the item database 22 and calculating statistics required for processing to generate dictionary information based on the item information. The calculation unit 12 performs the following processing for each of the input noun sequences.

First, the calculation unit 12 reads the item information in which one noun sequence is included in item names from the item database 22 and calculates statistics TF (Term Frequency), CTF (Term Frequency in the category), DF (Document frequency), CDF (Document frequency in the category), MF (Merchant frequency), CMF (Merchant frequency in the category) based on the item information. The definition of each statistic is as follows.

TF is the number of times a noun sequence appears in the item names in the read item information (one or more records) (which are in all of the read items). CTF is the value calculated for each item category indicated by the read item information, and it is the number of times a noun sequence appears in the item names corresponding to one category.

DF is "the number of categories" including items in which a noun sequence is included in item names. CDF is the value calculated for each item category indicated by the read item information, and it is the number of items (number of records) corresponding to one category.

MF is the number of shops that have registered the read item information (which is the number of shops counted based on all of the read items). CMF is the value calculated for each item category indicated by the read item information, and it is the number of shops that have registered the item information belonging to one category.

The calculation unit 12 obtains the above statistics for each of the noun sequences and then outputs the statistics data to the determination unit 13.

The determination unit 13 is a means of determining a noun sequence that uniquely derives one item category as the definitive category word based on the statistics for each item category specified by the calculation unit 12. The determination unit 13 performs the following processing for each of the extracted noun sequences.

The determination unit 13 specifies the item category that satisfies the following five conditions for the noun sequence to be processed. The following conditions 1 to 3 are regarded as filtering using thresholds, the condition 4 is regarded as filtering on the noun sequence, and the condition 5 is regarded as filtering on the item category.

(Condition 1) MF>Threshold THa
(Condition 2) CMF/MF>Threshold THb
(Condition 3) CTF/TF>Threshold THc
(Condition 4) The noun sequence does not include a specified word (e.g. a preposition such as "for" and a numeric representation such as a model number)
(Condition 5) The end of the item category (leaf category) corresponding to the noun sequence is not "Others".

The condition 1 is set with an intention to treat only the noun sequence used by a certain number of shops as the definitive category word. The condition 2 is set by focusing on the number of shops that associate items corresponding to the noun sequence with a specific item category, and it can be regarded as filtering by the shop intensity. The condition 3 is set by focusing on the number of noun sequences that appear in a specific item category, and it can be regarded as filtering by the noun sequence intensity.

The values of the thresholds THa, THb and THc in the conditions 1 to 3 may be set arbitrarily. For example, THa may be set to 10 or 1, THb may be set to 0.9 or 0.8, and THc may be set to 0.8 or 0.7. Further, for the condition 3, CDF and DF may be used instead of CTF and TF and, in this case, the condition 3 is CDF/DF>Threshold THd. This condition is set by focusing on the number of items corresponding to the noun sequence that are included in a specific item category, and it can be regarded as filtering by item intensity. Note that the conditions 1 and 3 can be omitted.

Words to be eliminated in the condition 4 are stored in advance as unnecessary words data in the dictionary generation server 10. Because the condition 4 is a condition for the noun sequence itself, this processing may be performed in the extraction unit 11 described above. In any case, with use of such an unnecessary words dictionary, it is possible to easily extract only the noun sequences necessary for processing. The condition 5 is a condition for excluding the category "Others" where various kinds of items can be included. The conditions 4 and 5 can be also omitted.

In the case where only one item category is specified, the determination unit 13 determines that the item category can be uniquely derived from the noun sequence, that is, the noun sequence can be treated as the definitive category word, and outputs a pair of the noun sequence and the item category to the registration unit 14. On the other hand, in the case where a plurality of item categories are specified, the determination unit 13 determines that one item category cannot be uniquely derived from the noun sequence, that is, the noun sequence cannot be treated as the definitive category word, and ends the processing without outputting data to the registration unit 14. As a matter of course, in the case where no item category is specified also, the determination unit 13 determines that the noun sequence cannot be treated as the definitive category word.

The registration unit 14 is a means of generating dictionary information and registering it in the dictionary database 23 (definitive category words dictionary). The registration unit 14 stores a pair of the noun sequence (definitive category word) and the item category input from the determination unit 13 as dictionary information into the dictionary database 23.

Figure 7:
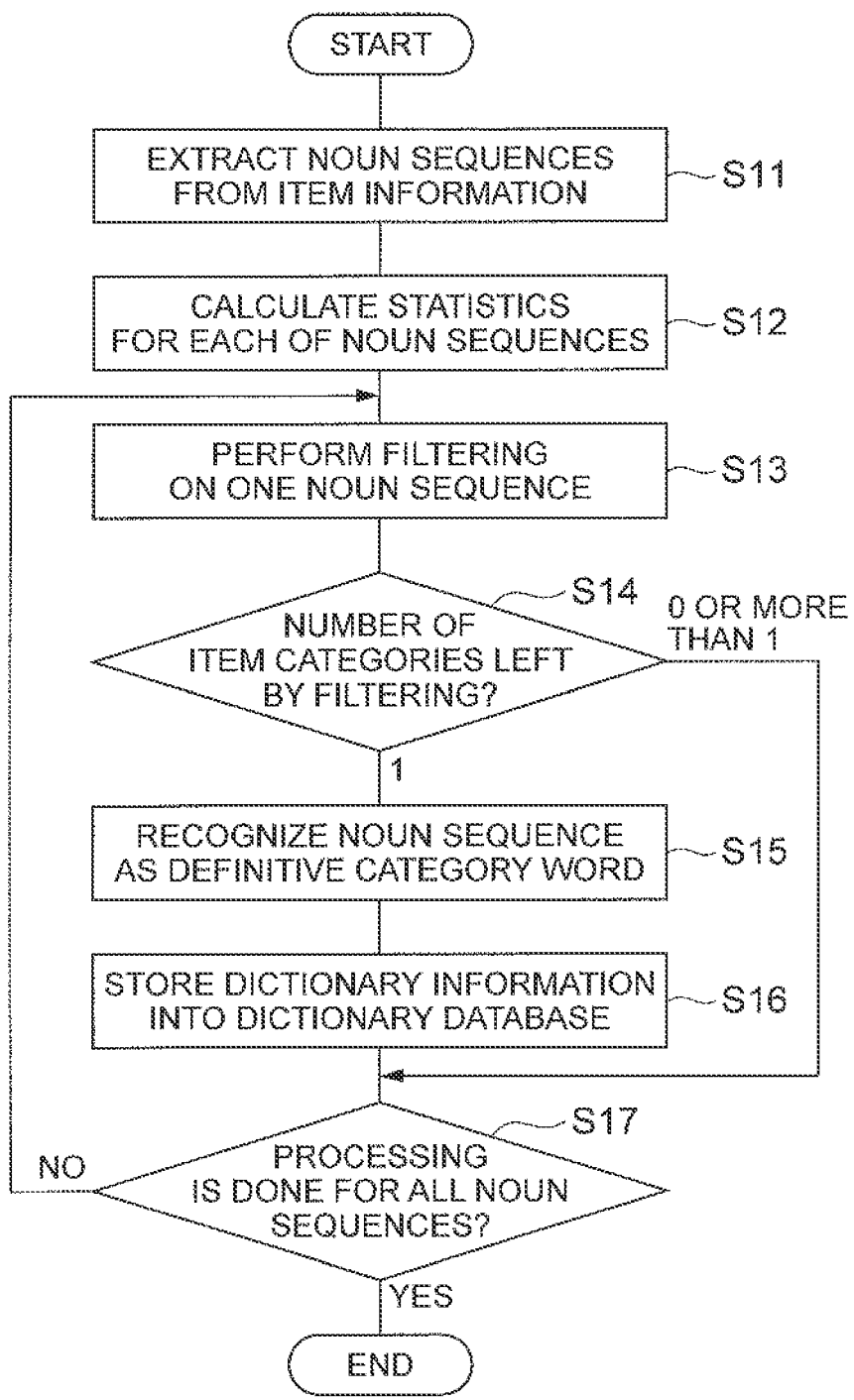
FIG. 7 is a flowchart showing an operation of the dictionary generation server according to the first embodiment.

The operation of the dictionary generation server 10 is described, and further, a dictionary generation method according to this embodiment is described hereinafter with reference to FIG. 7.

First, the extraction unit 11 extracts noun sequences from the item information read from the item database 22 (Step S11, extraction step). As described above, the extraction unit 11 can extract noun sequences by various methods. Next, the calculation unit 12 calculates the statistics TF, CTF, DF, CDF, MF and CMF for each of the extracted noun sequences (Step S12, calculation step).

Then, the determination unit 13 performs filtering by the above-described conditions 1 to 5 on each of the noun sequences and thereby determines whether or not to recognize each noun sequence as the definitive category word (determination step). To be specific, in the case where there is only one item category as a result of the filtering in Step S13 ("1" in Step S14), the determination unit 13 recognizes the noun sequence as the definitive category word (Step S15). In this case, the registration unit 14 stores the noun sequence and one item category as dictionary information into the dictionary database 23 (Step S16, registration step).

On the other hand, in the case where no item category is specified or a plurality of item categories are left as a result of the filtering ("0 or more than 1" in Step S14), the determination unit 13 ends the process immediately without recognizing the noun sequence as the definitive category word.

The processing in Steps S13 to S16 by the determination unit 13 and the registration unit 14 is executed on all of the noun sequences extracted from one item information (cf. Step S17).

Figure 8:
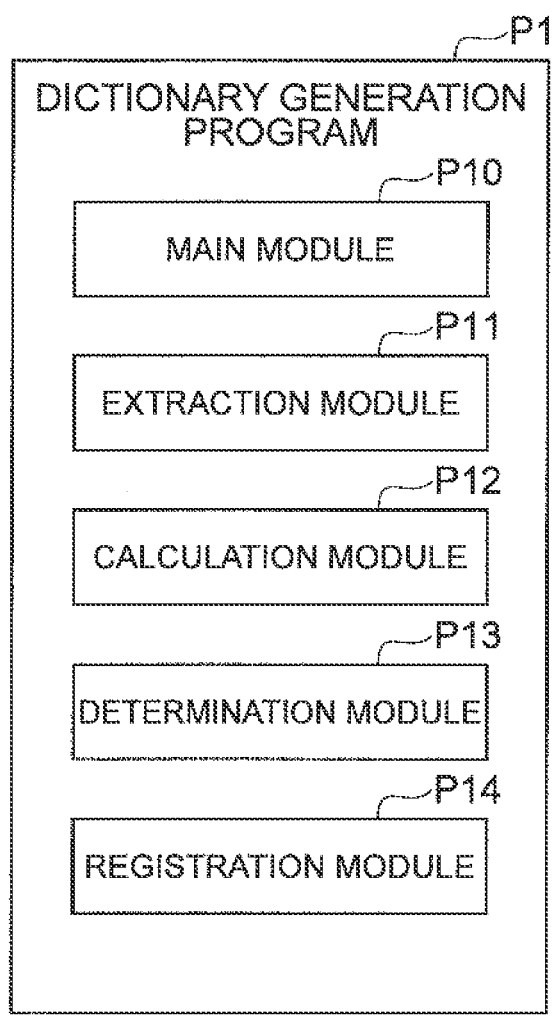
FIG. 8 is a diagram showing a configuration of a dictionary generation program according to the first and second embodiments.

Hereinafter, a dictionary generation program P1 that causes a computer to function as the dictionary generation server 10 is described with reference to FIG. 8.

The dictionary generation program P1 includes a main module P10, an extraction module P11, a calculation module P12, a determination module P13 and a registration module P14.

The main module P10 is a part that exercises control over the dictionary generation function. The functions implemented by executing the extraction module P11, the calculation module P12, the determination module P13 and the registration module P14 are equal to the functions of the extraction unit 11, the calculation unit 12, the determination unit 13 and the registration unit 14 described above, respectively.

The dictionary generation P1 is provided in the form of being stored in a tangible recording medium such as CD-ROM, DVD-ROM or semiconductor memory, for example. Further, the dictionary generation P1 may be provided through a communication network as a data signal superimposed onto a carrier wave.

As described above, according to this embodiment, one or more item categories are specified from the item information where noun sequences are included in item names, and the statistics for the noun sequences and the statistics for each of the specified item categories are calculated. Those statistics at least include the value about the number of shops. Then, for each item category, an index indicating how many shops have registered the item category, which is the shop intensity, is calculated based on the statistics. Based on this intensity, the definitive category word that uniquely derives one item category is determined, and the definitive category word and the item category are registered as dictionary information into the dictionary database 23. In this manner, it is possible to easily generate accurate dictionary information by focusing on the fact that how many shops have registered which item categories (shop intensity; CMF/MF) for the item information related to one certain word (noun sequence).

In this embodiment, if the definitive category word is determined by focusing also on the noun sequence intensity (CTF/TF) or item intensity (CDF/CF) for each item category, the accuracy of the dictionary information can be further improved. Further, because a noun sequence can be the definitive category word only when the total number of shops (MF) that have registered the item information where item names include the noun sequence exceeds a specified threshold, the accuracy of the dictionary information can be further improved. Furthermore, by excluding the noun sequence that is not necessary to be registered as the definitive category word using the above condition 4, the accuracy of the dictionary information can be further improved.

By using the dictionary information generated automatically as described above, it is possible to organize the item information in the item database 22. For example, the item category in the item information can be updated to a correct value by reference to the dictionary information. Further, by using the definitive category words dictionary when registering item information in the shop terminal Ts, a shop manager can set an appropriate item category without need for consideration. As a result, an item that should be extracted can be retrieved by category search, which allows the shop to obtain sales opportunities more reliably.

(Second Embodiment)

Figure 10:
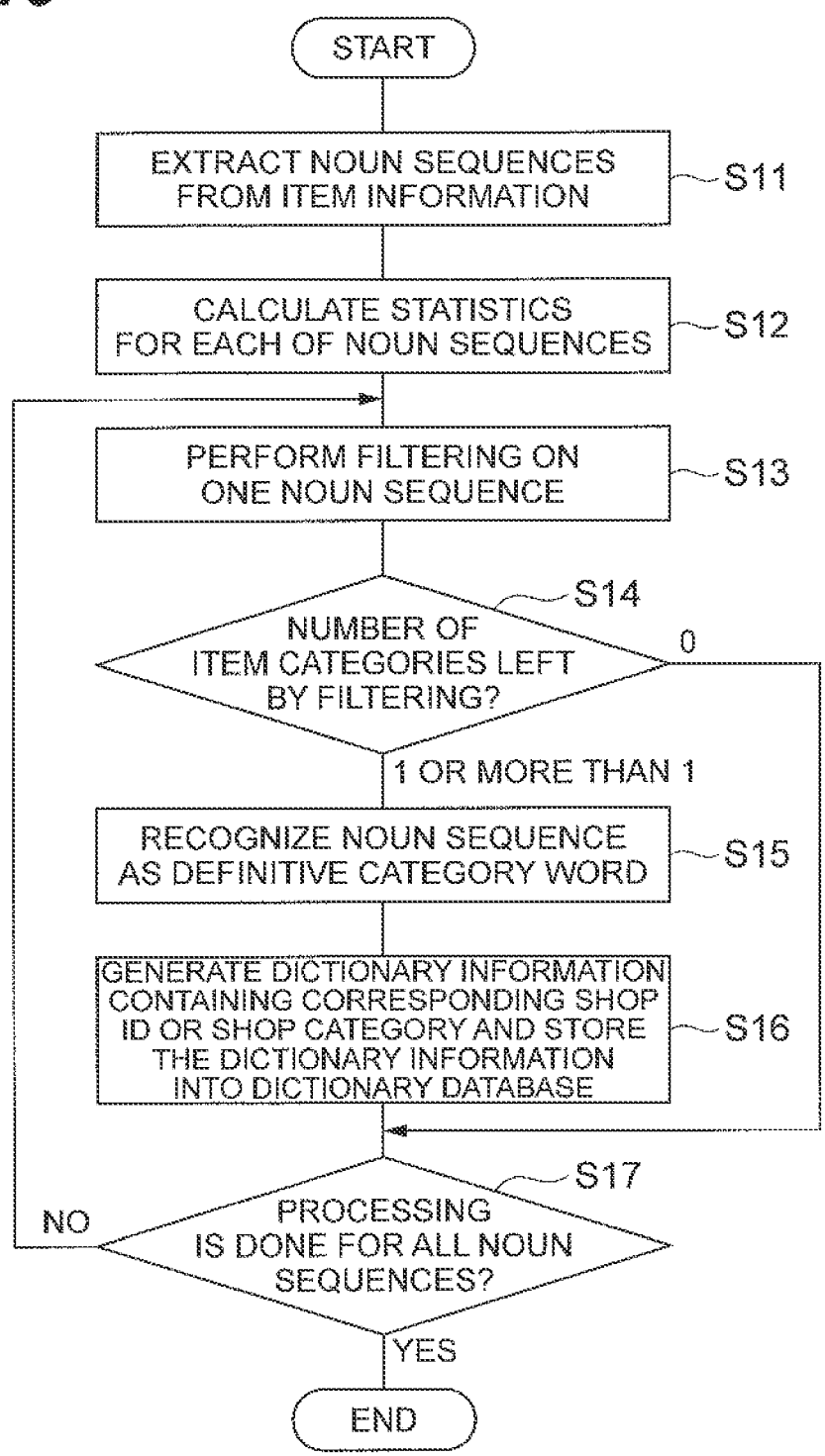
FIG. 10 is a flowchart showing an operation of the dictionary generation server according to the second embodiment.

A second embodiment is described hereinafter with reference to FIGS. 9 and 10. In this embodiment, the dictionary generation server 10 specifies the definitive category words in consideration of a shop or shop category as well. The same or similar matters as in the first embodiment are not redundantly described, and matters peculiar to this embodiment are particularly described below.

In this embodiment, in consideration of the fact that the same noun sequence can be associated with different item categories depending on a shop or shop category, the dictionary database 23 (dictionary information) is configured as shown in FIG. 9. The example of FIG. 9(a) shows the case where the definitive category words dictionary is prepared for each shop category, and each record contains the shop category, the definitive category words dictionary and the item category. The example of FIG. 9(b) shows the case where the definitive category words dictionary is prepared for each shop, and each record contains the shop ID, the definitive category words dictionary and the item category.

In the examples of FIGS. 9(a) and 9(b), in consideration of the fact that boots can be both the item related to fashion and the item related to DIY (do-it-yourself), the item categories that are different between shop categories or shops are associated with the definitive category word "Boots". Specifically, in FIG. 9(a), in the case of determining the category of items in the shop that sells daily items, one item category "DIY>Garden, DIY" corresponds to the definitive category word "Boots", and in the case of determining the category of items in the shop that sells fashion items, one item category "Fashion>Shoes" corresponds to the definitive category word "Boots". In FIG. 9(b), like the case of FIG. 9(a), the item category corresponding to the definitive category word "Boots" is different between the shop with the shop ID "S101" and the shop with the shop ID "S201".

The functions of the dictionary generation server 10 (see FIG. 6) on the assumption of the above dictionary database 23 are described hereinafter. The function of the determination unit 13, which is different from the one in the first embodiment, is particularly described below.

As in the first embodiment, the determination unit 13 specifies the item category using the above-described conditions 1 to 5 for the noun sequence to be processed. Then, when only one item category is specified, the determination unit 13 determines that the item category can be uniquely derived from the noun sequence in each shop ID or each shop category. The determination unit 13 then outputs a set of the noun sequence, the item category and the shop ID or the shop category to the registration unit 14. The shop ID or the shop category corresponding to the noun sequence and the specified item category may be acquired from the item database 22 and/or the shop database 21.

On the other hand, when a plurality of item categories are specified, the determination unit 13 acquires the shop ID or the shop category corresponding to each item category by reference to the shop database 21 and the item database 22. Then, the determination unit 13 outputs a set of the noun sequence, the item category and the corresponding shop ID or shop category to the registration unit 14 for each item category.

The operation of the dictionary generation server 10 and a dictionary generation method according to this embodiment are described hereinafter with reference to FIG. 10. This embodiment is different from the first embodiment in the processing in the case where one or more pairs of the noun sequence and the item category left by the filtering are found in Step S14. When one or more pairs are found ("1 or more than 1" in Step S14), the determination unit 13 determines the noun sequence as the definitive category word (Step S15). Then, the registration unit 14 stores a set of the definitive category word, one item category and the corresponding shop ID or shop category as dictionary information into the dictionary database (Step S16). In this embodiment, the registration unit 14 can generate a plurality of dictionary information for one noun sequence. On the other hand, when no item category is specified ("0" in Step S14), the determination unit 13 ends the processing for the noun sequence.

In the above-described second embodiment, the same advantages as in the first embodiment can be obtained. Further, in this embodiment, the dictionary information can be set in consideration of the characteristics of shops.

It should be noted that this embodiment can be applied also to the case where one shop has a plurality of shop categories (where one shop information identified by one shop ID contains a plurality of shop categories). For example, assume the case where there is a shop having two shop categories "daily items" and "fashion" shown in FIG. 9, and processing for the noun sequence "boots" is performed. In this case also, the dictionary information related to the definitive category word "boots" may be generated for both of those two shop categories or generated for either one of those shop categories, depending on the result of the filtering by the above-conditions 1 to 5.

(Third Embodiment)

A third embodiment is described hereinafter with reference to FIGS. 11 and 12. In this embodiment, the dictionary generation server 10 updates the item categories in the item information based on the generated dictionary information. Then, the dictionary generation server 10 tries to generate additional dictionary information using the updated item database 22. Specifically, the dictionary generation server 10 accumulates the dictionary information little by little by updating the item categories in the item information to the correct ones. Hereinafter, the same or similar matters as in the first embodiment are not redundantly described, and matters peculiar to this embodiment are particularly described.

Figure 11:
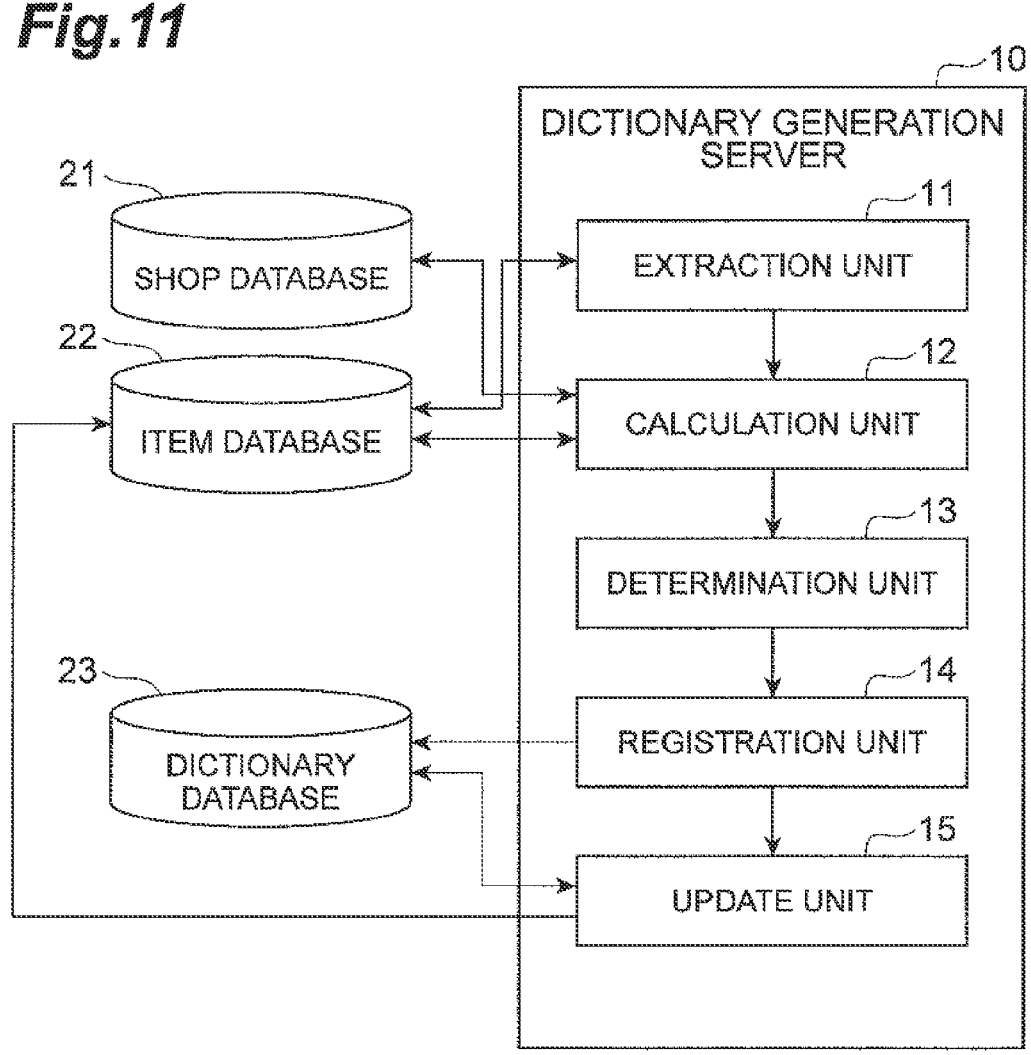
FIG. 11 is a block diagram showing a functional configuration of a dictionary generation server according to a third embodiment.

As shown in FIG. 11, the dictionary generation server 10 further includes an update unit 15. The update unit 15 is a means of updating the item information in the item database 22 based on the generated dictionary information. The update unit 15 performs the following processing for each of one or more dictionary information generated this time.

First, the update unit 15 specifies item information where an item name includes the definitive category word indicated by the dictionary information and an item category is different from the one indicated by the dictionary information. Next, the update unit 15 updates the item category in the specified item information (which is the item category estimated as an error or noise) to the item category indicated by the dictionary information (which is the item category that should have been registered). When the update processing is completed for all of the currently generated dictionary information, a series of processing steps that begin with the extraction unit 11 (the generation of the dictionary information and the update of the item database) are repeated based on the updated item database 22.

Each time the series of processing steps are performed, the determination unit 13 reduces the threshold THb used in the above-described condition 2, which is the threshold for the shop intensity. For example, the determination unit 13 sets THb=1.0 in the processing in the first cycle and reduces THb by a specified value each time after the second cycle (for example, by 0.1 or 0.05 each time).

Figure 12:
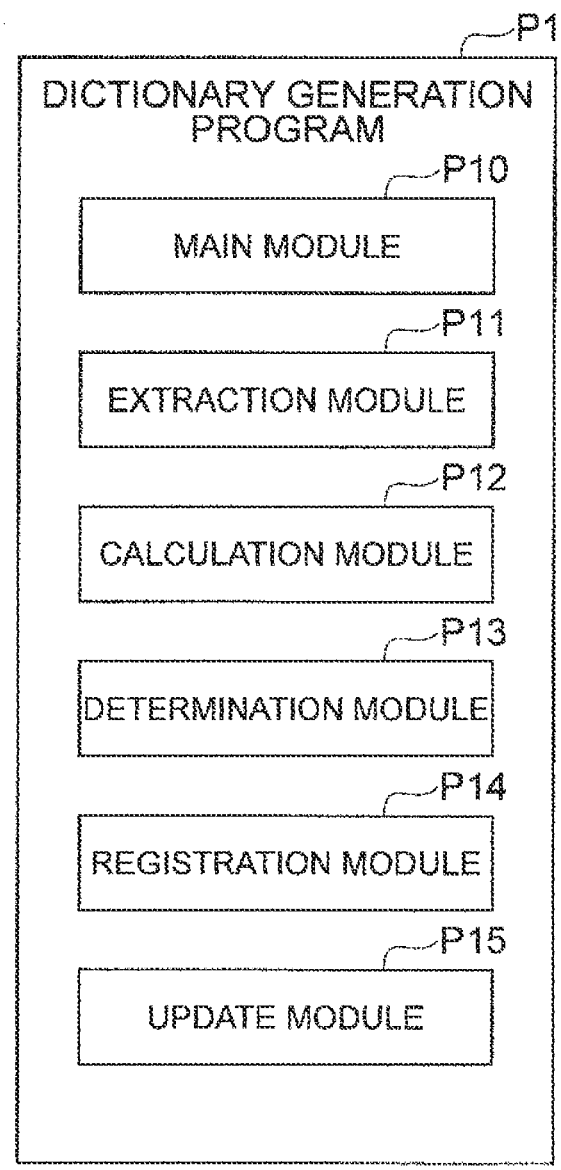
FIG. 12 is a diagram showing a configuration of a dictionary generation program according to the third embodiment.

A dictionary generation program P1 that causes a computer to function as the dictionary generation server 10 according to this embodiment is as shown in FIG. 12. In this embodiment, the dictionary generation program P1 further includes an update module P15. The function implemented by executing the update module P15 is the same as the function of the update unit 15 described above.

In the above-described third embodiment, the same advantages as in the first embodiment can be obtained. Further, in this embodiment, processing of updating the item category in the item information to the appropriate one using the generated dictionary information is repeated with gradually reducing the threshold for the shop intensity (CMF/MF). In this manner, by repeating the processing of generating the dictionary information and organizing the item information sequentially from the most reliable definitive category word, it is possible to further improve the accuracy of the dictionary information.

The method of generating the dictionary information by the repetitive processing can be equally applied also to the second embodiment. In this case, the update unit 15 performs the update of the item category for the item information where item names include the definitive category word indicated by one dictionary information, a shop ID corresponds to the shop ID or shop category indicated by the dictionary information and an item category is different from the one indicated by the dictionary information. Thus, the update unit 15 refers to the shop database 21 according to need in this specifying processing.

(Fourth Embodiment)

A fourth embodiment is described hereinafter with reference to FIGS. 13 to 16. A dictionary generation server 30 according to this embodiment specifies the definitive category word in consideration also of to what degree a word used as a part of an item name overlaps between categories. Hereinafter, the same or similar matters as in the first embodiment are not redundantly described, and matters peculiar to this embodiment are particularly described.

Figure 13:
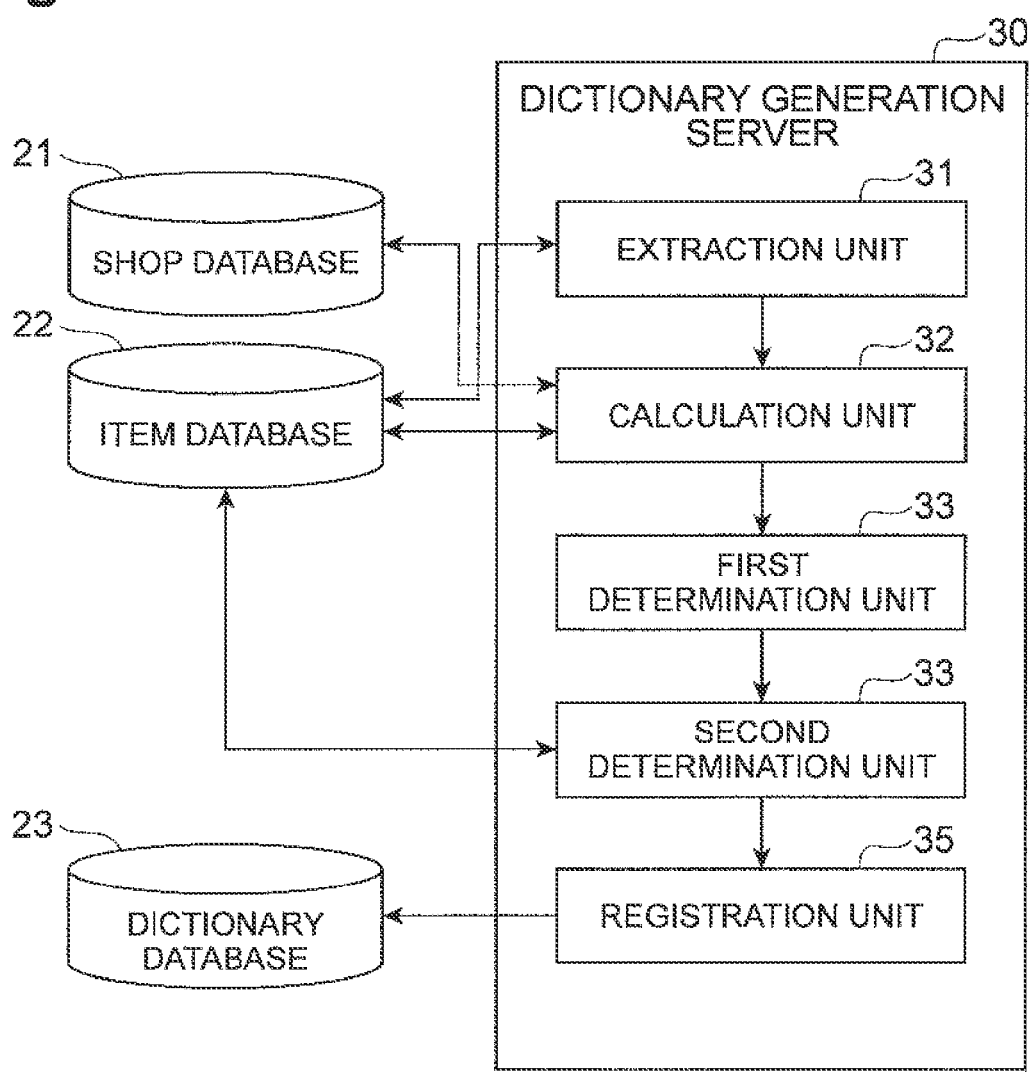
FIG. 13 is a block diagram showing a functional configuration of a dictionary generation server according to fourth and fifth embodiments.

The hardware configuration of the dictionary generation server 30 is the same as shown in FIG. 5. As shown in FIG. 13, the dictionary generation server 30 includes an extraction unit 31, a calculation unit 32, a first determination unit 33, a second determination unit 34, and a registration unit 35 as functional components. The functions of the extraction unit 31, the calculation unit 32 and the registration unit 35 are the same as the functions of the extraction unit 11, the calculation unit 12 and the registration unit 14 in the first embodiment, and therefore the first determination unit 33 and the second determination unit 34 are particularly described below.

The first determination unit 33 is a means of determining a noun sequence that is likely to uniquely derive one item category as a candidate word based on statistics for each of the item categories specified by the calculation unit 32. The first determination unit 33 performs the following processing for each of noun sequences.

The first determination unit 33 performs filtering by the above-described conditions 1 to 5 in the same manner as the determination unit 13 and specifies the item category corresponding to the noun sequence to be processed. Then, in the case where only one item category is specified, the first determination unit 33 recognizes the noun sequence as "candidate word" and recognizes the item category as "major category". The first determination unit 33 then outputs a pair of the candidate word and the major category to the second determination unit 34. On the other hand, in the case where a plurality of one item categories are specified, the first determination unit 33 determines that one item category cannot be uniquely derived from the noun sequence, that is, the noun sequence cannot be treated as the definitive category word, and ends the processing without outputting data to the second determination unit 34. In the case where no item category is specified also, the first determination unit 33 determines that the noun sequence cannot be treated as the definitive category word.

The second determination unit 34 is a means of determining whether the candidate word is concluded as the definitive category word or not based on the degree of overlap of words between item categories. The second determination unit 34 performs the following processing for each candidate word.

First, the second determination unit 34 reads item information in which item names include a candidate word from the item database 22 and specifies one or more item categories indicated by the item information. The specified item categories include item categories other than major categories, and the second determination unit 34 recognizes the other item categories as "minor category".

Next, the second determination unit 34 determines the degree of overlap of noun sequences (candidate words and the other noun sequences) between the major categories and the minor categories for each hierarchical level sequentially from the top (first hierarchical level) of the category tree of the item category. In other words, the second determination unit 34 determines the overlap degree of noun sequences. Hereinafter, the N-th hierarchical level of the item category is referred to also as "item category [N]".

Processing of the second determination unit 34 on the first hierarchical level is described. For example, it is assumed that the major category [1] corresponding to a candidate word is "Sake, Shochu", and there are "Beer, Wines and Spirits", "Lady's fashion" and "Men's fashion" as the minor category [1] for that word.

In this case, the second determination unit 34 calculates the degree of overlap (overlap degree or overlap rate) between a group of noun sequences of all items included in the major category [1] and a group of noun sequences of each item included in the minor category [1]: $D=(A \cap B)/|A|$. Note that the equation for obtaining the overlap degree D is not limited thereto. The overlap degree D is calculated for each item in each minor category [1]. The variable A indicates a group of noun sequences extracted from the item name of one item which belongs to the minor category [1] and in which the candidate word is included in the item name. The variable B indicates a group of noun sequences extracted from the item names of all items which belong to the major category [1] and in which the candidate word is included in the item name. $(A \cap B)$ indicates the number of nouns that appear in both of the two groups A and B. $|A|$ is the number of nouns that constitute the group A.

When the overlap degree D is equal to or more than a specified threshold THf (for example, THf=0.7), the second determination unit 34 determines that the item belonging to the minor category [1] should belong to the major category [1] rather than the minor category [1] and maintains the candidate word as it is. On the other hand, when the overlap degree D is less than the specified threshold THf, the second determination unit 34 determines that the item should belong to the minor category [1] (that is, an appropriate item category is set to the item). This determination means that the candidate word can be associated not only with the major category [1] but also with the minor category [1]. Thus, the second determination unit 34 ends the processing for the candidate word without recognizing the candidate word as the definitive category word.

A calculation example of the overlap degree is as follows. For example, it is assumed that a candidate word is CW, and the candidate word CW and other noun sequences w1 and w2 are included in the group A, and the candidate word CW and other noun sequences w1, w2, w3, w4, w5, w6, w7, w8 and w9 are included in the group B. In this case, $|A|=3$. Because all of the words CW, w1 and w2 that are included in the group A are also present in the group B, $(A \cap B)=3$. Accordingly, the overlap degree D in this case is $3/3=1.0$. If the threshold THf is 0.7, D≥THf, and therefore the second determination unit 34 determines that the items corresponding to the group A should belong to the major category and maintains the candidate word CW.

On the other hand, it is assumed that the candidate word CW and other noun sequences w1 and w10 are included in the group A, and the candidate word CW and other noun sequences w1, w2, w3, w4, w5, w6, w7, w8 and w9 are included in the group B. In this case also, $|A|=3$. Because the number of words included in both of the groups A and B is two (CW and w1), $(A \cap B)=2$. Accordingly, the overlap degree D in this case is $2/3=0.66$. If the threshold THf is 0.7, D<THf, and therefore the second determination unit 34 determines that the items corresponding to the group A should belong to the minor category as they are and the candidate word CW is not the definitive category word.

The second determination unit 34 makes determination based on the overlap degree D for each item in each minor category [1] and, if the category word can be maintained to the end, the second determination unit 34 then makes determination about the degree of overlap of noun sequences for the second hierarchical level of the major category. It is assumed in this example that the major category [2] corresponding to the candidate word is "Sake, Shochu>Sake", and there are "Sake, Shochu>Shochu", "Sake, Shochu>Plum Wine" and "Sake, Shochu>Others" as the minor category [2] for that word.

In this case, just like the processing in the first hierarchical level, the second determination unit 34 calculates the degree of overlap (overlap degree) of noun sequences included in item names that are used between the major category [2] and the minor category [2]: $D=(A \cap B)/|A|$. In this case, the variable A is a group of noun sequences extracted from the item name of one item which belongs to the minor category [2] and in which the candidate word is included in the item name. The variable B is a group of noun sequences extracted from the item names of all items which belong to the major category [2] and in which the candidate word is included in the item name.

The second determination unit 34 makes determination based on the overlap degree D and the threshold THf for each item in each minor category [2]. Then, if the category word can be maintained to the end, the second determination unit 34 makes determination about the degree of overlap of noun sequences for the third hierarchical level of the major category.

On the other hand, when the item with D<THf is found in the course of the determination in the second hierarchical level, the second determination unit 34 cannot recognize the candidate word as the definitive category word in consideration of the second or lower hierarchical level. However, because the major category [1] can be uniquely specified from the candidate word in the first hierarchical level, the second determination unit 34 recognizes the candidate word as the definitive category word and outputs a pair of the definitive category word and the major category [1] to the registration unit 14. In this case, the second determination unit 34 recognizes the definitive category word that can uniquely derive the category (high or intermediate level category) in the middle of reaching the leaf category.

As described above, the minor category includes the one that is noise and should be changed to the major category and the one that is not noise and should not be changed to the major category, and the second determination unit 34 determines which case the minor category being processed corresponds to for each item. The second determination unit 34 performs the above processing repeatedly until reaching the item category (leaf category) in the lowest level in some cases and thereby determines whether the candidate word can be treated as the definitive category word. The processing of the second determination unit 34 can be summarized as follows.

- If the overlap degree is high between a group of noun sequences of all items included in the major category [N] and a group of noun sequences of the respective items in each minor category [N], the second determination unit 34 performs processing in the major category [N+1]. However, if the N-th hierarchical level is the leaf category in this case, the second determination unit 34 recognizes the candidate word as the definitive category word for the leaf category.
- If there is a minor category having a low overlap degree of noun sequences with the major category in the N-th hierarchical level, the second determination unit 34 recognizes the candidate word as the definitive category word for the major category [N−1]. However, if N=1 in this case, the second determination unit 34 rejects the candidate word. Alternatively, if N=1, the second determination unit 34 may register the candidate word in the unnecessary words dictionary.

Figure 14:
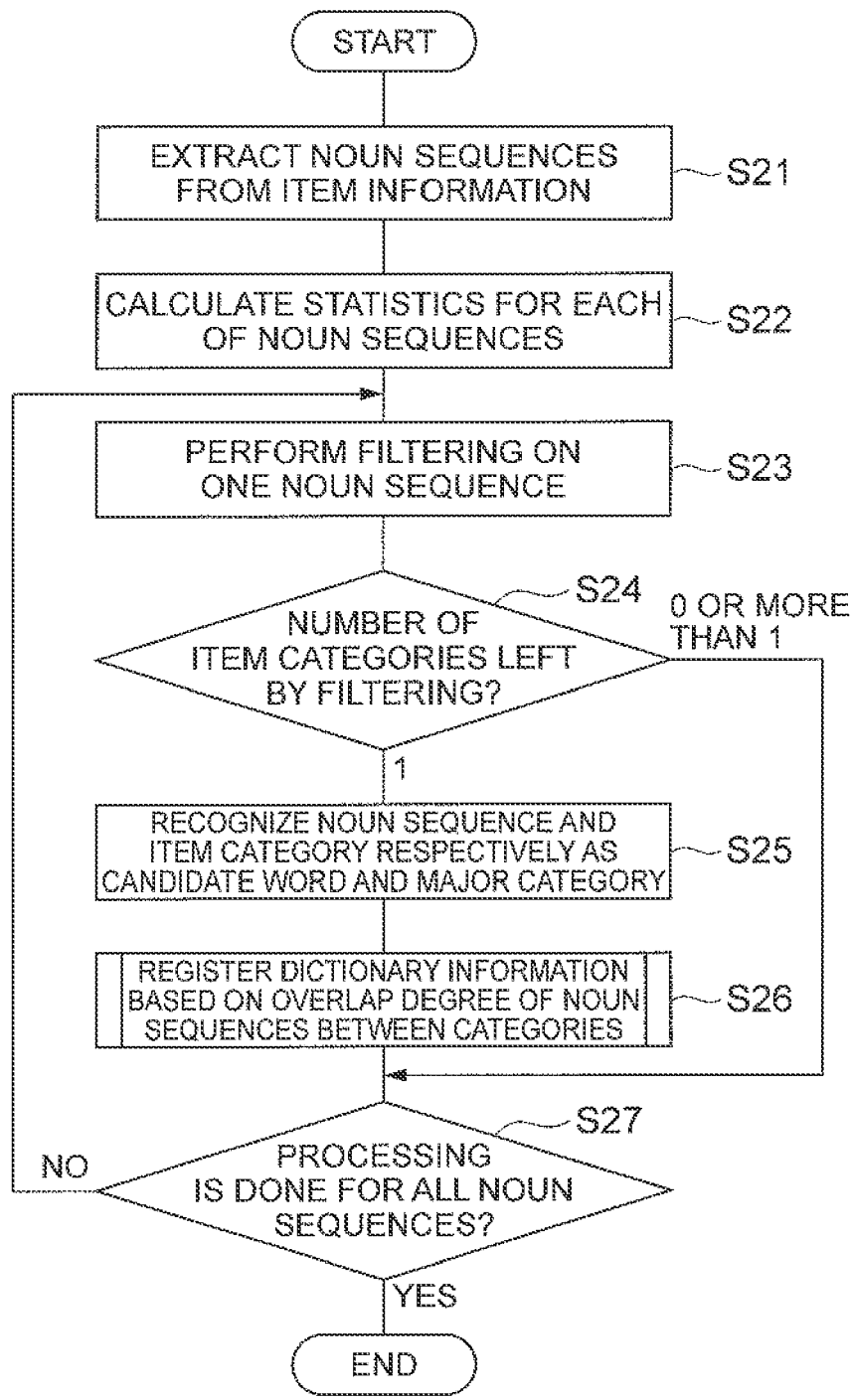
FIG. 14 is a flowchart showing an operation of the dictionary generation server according to the fourth embodiment.

The operation of the dictionary generation server 30 is described, and further, a dictionary generation method according to this embodiment is described hereinafter with reference to FIGS. 14 and 15. Note that, however, because the processing in Steps S21 to S24 and S27 are the same as Steps S11 to S14 and S17 in the first embodiment (FIG. 7), only the processing in Steps S25 and S26, which are different from the processing in the first embodiment, is described below.

In the case where only one item category can be specified for a noun sequence as a result of the filtering ("1" in Step S24), the determination unit 13 recognizes the noun sequence and the item category as the candidate word and the major category, respectively (Step S25). In this case, the determination of the definitive category word and the registration of the dictionary information are performed in consideration also of the overlap degree of noun sequences between the major category and the minor category (Step S26).

Figure 15:
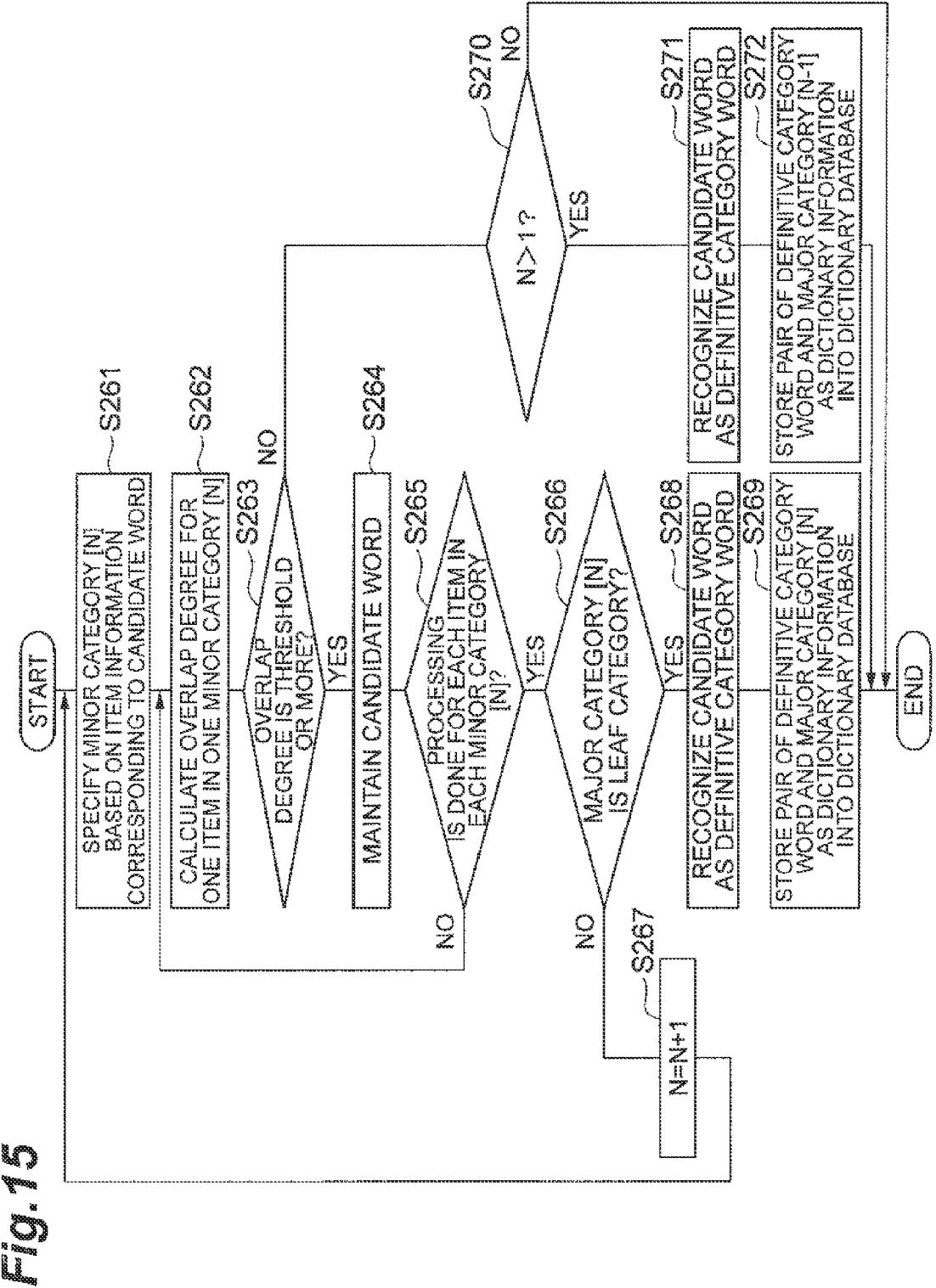
FIG. 15 is a flowchart showing details of processing based on the degree of overlap of noun sequences in FIG. 14.

The details of Step S26 are as shown in FIG. 15. First, the second determination unit 34 specifies the minor category [N] based on the item information corresponding to the candidate word (Step S261). Note that the initial value of N is 1. Then, the second determination unit 34 calculates the overlap degree $D=(A \cap B)/|A|$ between a group of noun sequences of all items included in the major category [N] and one item in one minor category [N] (Step S262) and if the overlap degree is a specified threshold or more (YES in Step S263), the candidate word is maintained as it is (Step S264), and the processing of Steps S262 to S264 is executed further on an item to be compared (cf. Step S265). In the case where the candidate word can be maintained as a result of performing processing on each item in each minor category [N], the second determination unit 34 determines whether the major category [N] is the leaf category (Step S266).

When the major category [N] is not the leaf category (NO in Step S266), the second determination unit 34 performs the processing of Steps S261 to S265 described above in the next (N+1) hierarchical level (Step S267). When the major category [N] is the leaf category (YES in Step S266), the second determination unit 34 recognizes the candidate word as the definitive category word (Step S268), and the registration unit 35 stores a pair of the definitive category word and the major category [N] as dictionary information into the dictionary database (Step S269).

In the case where the overlap degree is less than the threshold (NO in Step S263), the processing is performed according to the currently processed hierarchical level. To be specific, when the overlap degree is determined in the second or lower hierarchical level (YES in Step S270), the second determination unit 34 recognizes the candidate word as the definitive category word (Step S271), and the registration unit 35 stores a pair of the candidate word and the major category [N−1] (which is the category in the immediately higher hierarchical level) as dictionary information into the dictionary database (Step S272). On the other hand, when the overlap degree is determined in the first hierarchical level (NO in Step S270), the second determination unit 34 ends the processing without generating the dictionary information.

Figure 16:
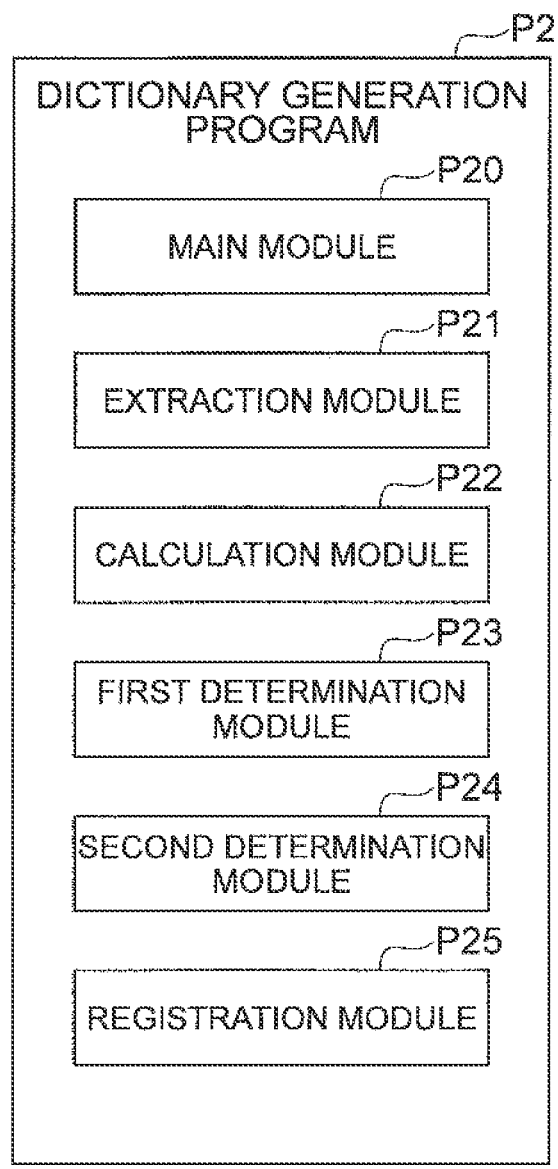
FIG. 16 is a diagram showing a configuration of a dictionary generation program according to the fourth and fifth embodiments.

Hereinafter, a dictionary generation program P2 that causes a computer to function as the dictionary generation server 30 is described with reference to FIG. 16.

The dictionary generation program P2 includes a main module P20, an extraction module P21, a calculation module P22, a first determination module P23, a second determination module P24, and a registration module P25.

The main module P20 is a part that exercises control over the dictionary generation function. The functions implemented by executing the extraction module P21, the calculation module P22, the first determination module P23, the second determination module P24 and the registration module P25 are equal to the functions of the extraction unit 31, the calculation unit 32, the first determination unit 33, the second determination unit 34 and the registration unit 35 described above, respectively.

The dictionary generation program P2 can be also distributed by various methods just like the dictionary generation program P1 described above.

In the above-described fourth embodiment, the same advantages as in the first embodiment can be obtained. In addition, in this embodiment, by determining whether the major category can be associated with the definitive category word by focusing on the overlap degree of words between the major category and the minor category, it is possible to further improve the accuracy of the dictionary information. To be more specific, the item category to be associated with the definitive category word is searched by defining the major category in each hierarchical level sequentially from the top of the category tree, the item category can be accurately specified.

(Fifth Embodiment)

Figure 17:
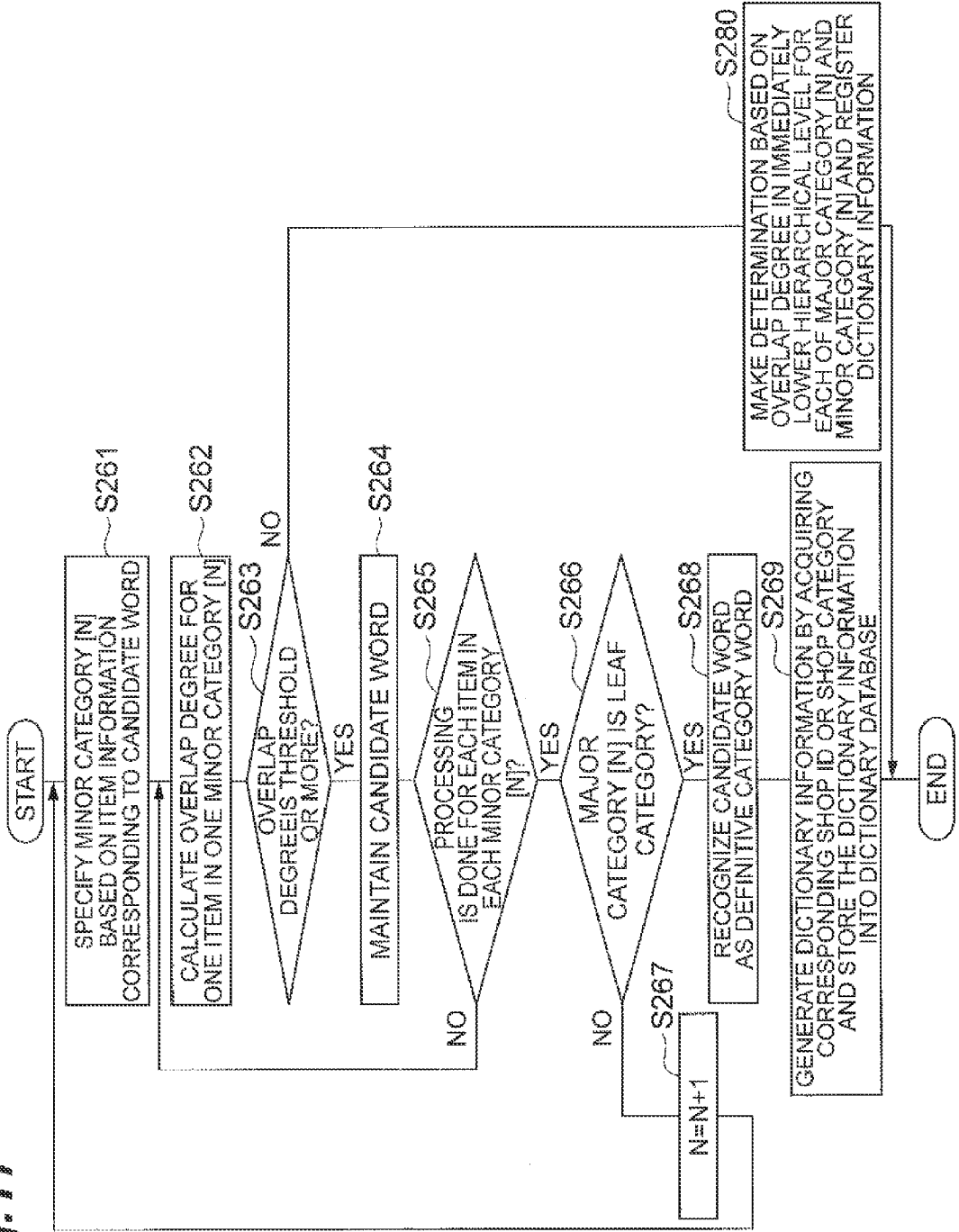
FIG. 17 is a flowchart showing details of processing based on the degree of overlap of noun sequences according to the fifth embodiment.

A fifth embodiment is described hereinafter with reference to FIG. 17. This embodiment adopts the technical idea of the second embodiment to the fourth embodiment, and the dictionary generation server 30 specifies the definitive category word in consideration also of a shop or shop category. Hereinafter, the same or similar matters as in the fourth embodiment are not redundantly described, and matters peculiar to this embodiment are particularly described.

In this embodiment, the dictionary database 23 (dictionary information) is configured in the same manner as that of the second embodiment (FIG. 9) in consideration of the fact that the same word can be associated with different item categories depending to a shop or shop category.

The function of the dictionary generation server 30 on the assumption of the above dictionary database 23 is described hereinafter. The function of the second determination unit 34, which is different from the one in the third embodiment, is described below.

First, the second determination unit 34 reads the item information in which item names include a candidate word from the item database 22 and specifies the minor category. Next, the second determination unit 34 determines the degree of overlap of noun sequences between a group of noun sequences of all items included in the major categories and each item in each minor category for each hierarchical level sequentially from the top (first hierarchical level) of the category tree of the item category. When the overlap degree D is equal to or more than a specified threshold THf (for example, THf=0.7), the second determination unit 34 determines that the item belonging to the minor category [1] should belong to the major category [1] rather than the minor category [1] and maintains the candidate word as it is. Then, the second determination unit 34 proceeds to the subsequent processing for the major category [1]. This is the same as in the third embodiment up to this point.

On the other hand, when the overlap degree D is less than the specified threshold THf, the second determination unit 34 determines that the item should belong to the minor category [1] and performs determination based on the overlap degree in the lower hierarchical level of the minor category [1] in the same manner as the processing for the major category.

The processing of the second determination unit 34 can be summarized as follows.

- If the overlap degree of noun sequences is high between a group of noun sequences of all items included in the major category [N] and a group of noun sequences of each item in each minor category [N], the second determination unit 34 performs processing in the major category [N+1]. However, if the N-th hierarchical level is the leaf category in this case, the second determination unit 34 recognizes the candidate word as the definitive category word for the leaf category (which is the same as in the fourth embodiment).
- If there is a minor category having a low overlap degree of noun sequences with the major category in the N-th hierarchical level, the second determination unit 34 recognizes that the candidate word can be also the definitive category word for any of the N-th or lower hierarchical level in the minor category. Then, the second determination unit 34 performs processing in the (N+1)th hierarchical level for each of the major category and the minor category.

The operation of the dictionary generation server 10 and a dictionary generation method according to this embodiment are described hereinafter with reference to FIG. 17. This embodiment is different from the fourth embodiment in the processing of Step S269 and the processing in the case where the overlap degree is less than a threshold in Step S263.

In Step S269, the second determination unit 34 acquires the shop ID or shop category corresponding to the pair from the item database 22 and/or the shop database 21 and generates dictionary information, and stores the dictionary information into the dictionary database 23.

In the case where the overlap degree is less than the threshold (NO in Step S263), the second determination unit 34 performs determination based on the overlap degree in the immediately lower hierarchical level for each of the major category [N] and the minor category [N], and the registration unit 14 registers the dictionary information (Step S280).

In the above-described fifth embodiment, the same advantages as in the fourth embodiment can be obtained. Further, in this embodiment, the dictionary information can be set in consideration of the characteristics of shops.

(Sixth Embodiment)

Figure 18:
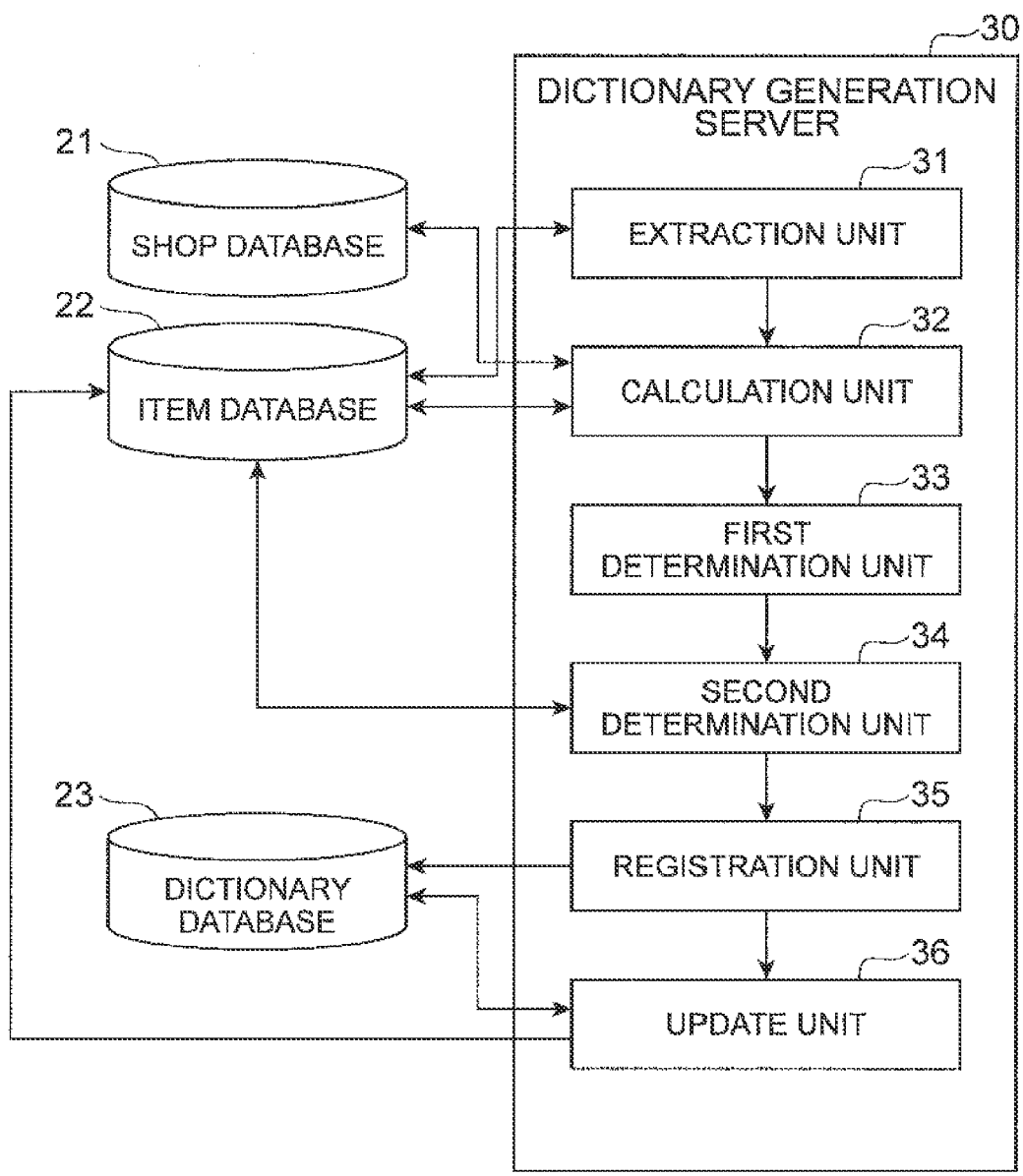
FIG. 18 is a block diagram showing a functional configuration of a dictionary generation server according to a sixth embodiment.

A sixth embodiment is described hereinafter with reference to FIGS. 18 and 19. In this embodiment, the dictionary generation server 30 accumulates the dictionary information little by little by updating the item categories in the item information to appropriate ones. Hereinafter, the same or similar matters as in the fourth embodiment are not redundantly described, and matters peculiar to this embodiment are particularly described.

In this embodiment, the dictionary generation server 30 further includes an update unit 36. The update unit 36 is a means of updating the item information in the item database 22 based on the generated dictionary information. The update unit 36 performs the following processing for each of one or more dictionary information generated this time.

First, the update unit 36 specifies the item information where item names include the definitive category word indicated by one dictionary information and the item category is different from the one indicated by the dictionary information in the item database 22. Next, the update unit 36 updates the item category in the specified item information (which is the item category estimated as an error or noise) to the item category indicated by the dictionary information (which is the appropriate item category that should have been registered). When the update processing is completed for all of the currently generated dictionary information, a series of processing steps that begin with the extraction unit 31 (the generation of the dictionary information and the update of the item database) are repeated based on the updated item database 22. In this manner, the function of the update unit 36 is the same as the function of the update unit 15 in the third embodiment.

Each time the series of processing steps are performed, the first determination unit 33 reduces the threshold THb used in the above condition 2, which is the threshold for the shop intensity. For example, the first determination unit 33 sets THb=1.0 in the processing in the first cycle and reduces THb by a specified value each time after the second cycle (for example, by 0.1 or 0.05 each time).

Figure 19:
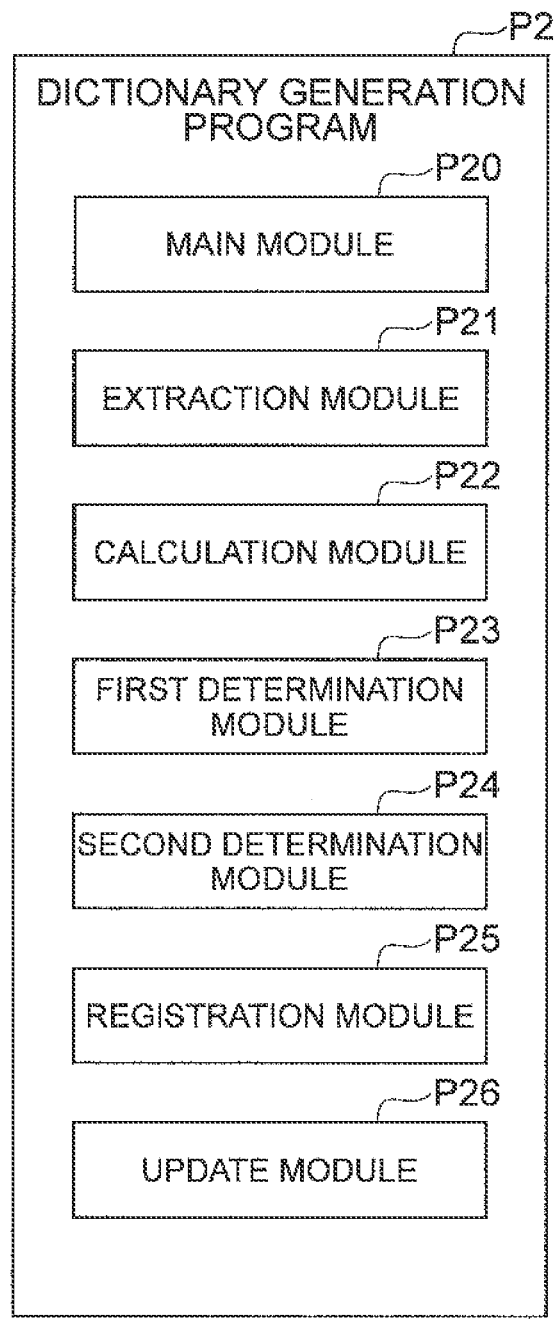
FIG. 19 is a diagram showing a configuration of a dictionary generation program according to the sixth embodiment.

A dictionary generation program P1 that causes a computer to function as the dictionary generation server 30 according to this embodiment is as shown in FIG. 19. In this embodiment, the dictionary generation program P2 further includes an update module P26. The function implemented by executing the update module P26 is the same as the function of the update unit 36 described above.

In the above-described sixth embodiment, the same advantages as in the fourth embodiment can be obtained. Further, in this embodiment, processing of updating the item category in the item information to the appropriate one by using the generated dictionary information, with gradually reducing the threshold for the shop intensity (CMF/MF) is repeated. In this manner, by repeating the processing of generating the dictionary information and organizing the item information sequentially from the most reliable definitive category word, it is possible to further improve the accuracy of the dictionary information.

The method of generating the dictionary information by the repetitive processing using the item database 22 can be equally applied also to the fifth embodiment. In this case, the update unit 36 specifies the item information where item names include the definitive category word indicated by one dictionary information, a shop ID corresponds to the shop ID or shop category indicated by the dictionary information, and the item category is different from the one indicated by the dictionary information in the item database 22. Thus, the update unit 36 refers to the shop database 21 according to need in this specifying processing.

(Seventh Embodiment)

Figure 20:
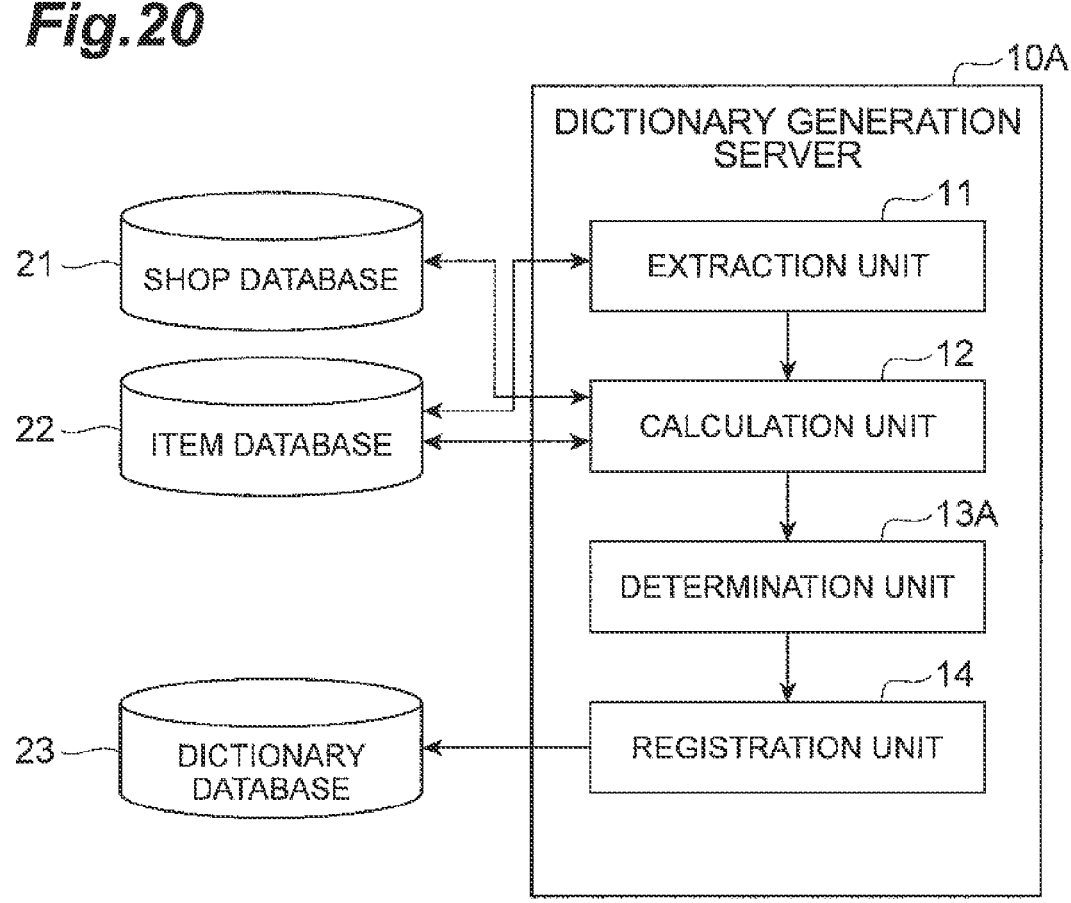
FIG. 20 is a block diagram showing a functional configuration of a dictionary generation server according to a seventh embodiment.

A seventh embodiment is described hereinafter with reference to FIGS. 20 and 22. In this embodiment, a dictionary generation server 10A sets a noun sequence to any one of a Type 1 definitive category word, a Type 2 definitive category word, a reference word or an unnecessary word. Hereinafter, the same or similar matters as in the first embodiment are not redundantly described, and matters peculiar to this embodiment are particularly described.

The Type 1 definitive category word is a word that uniquely specifies one item category, which corresponds to the "definitive category word" in the above-described first to sixth embodiment. The Type 2 definitive category word is a word with less definitiveness of an item category than the Type 1 definitive category word. The reference word is a word with less definitiveness of an item category than the Type 2 definitive category word.

In the case of using the dictionary information generated in this embodiment, the item category can be set as follows. When a certain item is determined to belong to an item category corresponding to the Type 1 definitive category word, the item is definitely associated with the item category, and the shop cannot change the association. When a certain item is determined to belong to an item category corresponding to the Type 2 definitive category word, the shop can associate the item with another item category different from the determined one with conditions (for example, on condition of obtaining approval of the EC site manager). When a certain item is determined to belong to an item category corresponding to the reference word, the shop can associate the item with another item category different from the determined one without condition. As a matter of course, each shop can associate an item with an item category corresponding to the Type 2 definitive category word or the reference word.

One word can be the Type 2 definitive category word in a plurality of item categories in some cases, and one word can be the reference word in a plurality of item categories in other cases. Further, one word can be the Type 2 definitive category word in a certain item category and can be the reference word in another item category. However, in no case, one Type 1 definitive category word serves as the Type 1 definitive category word, the Type 2 definitive category word and the reference word in another item category. The unnecessary word is a word to be excluded indicated by the above condition 4, and in no case one unnecessary word serves also as the Type 1 definitive category word, the Type 2 definitive category word or the reference word.

The hardware configuration of the dictionary generation server 10A is the same as that in the first embodiment (cf. FIG. 5). As shown in FIG. 20, teh dictionary generation server 10A is different from the dictionary generation server 10 according to the first embodiment in that it includes a determination unit 13A in place of the determination unit 13.

The determination unit 13A is a means of determining which of the Type 1 definitive category word, the Type 2 definitive category word, the reference word and the unnecessary word a noun sequence corresponds to based on statistics for each item category specified by the calculation unit 12.

In this embodiment, the determination unit 13A uses the following conditions 1 and 2 in the first embodiment. The first threshold THb and the second threshold THa can be set to any value, as in the first embodiment. In this embodiment, when a noun sequence satisfies the condition 1, the noun sequence is defined to reach a peak in all. Further, when a noun sequence satisfies the condition 2 in one certain item category, the noun sequence is defined to reach a peak in the item category.

(Condition 1) MF>THa
(Condition 2) CMF/MF>THb

Figure 21:
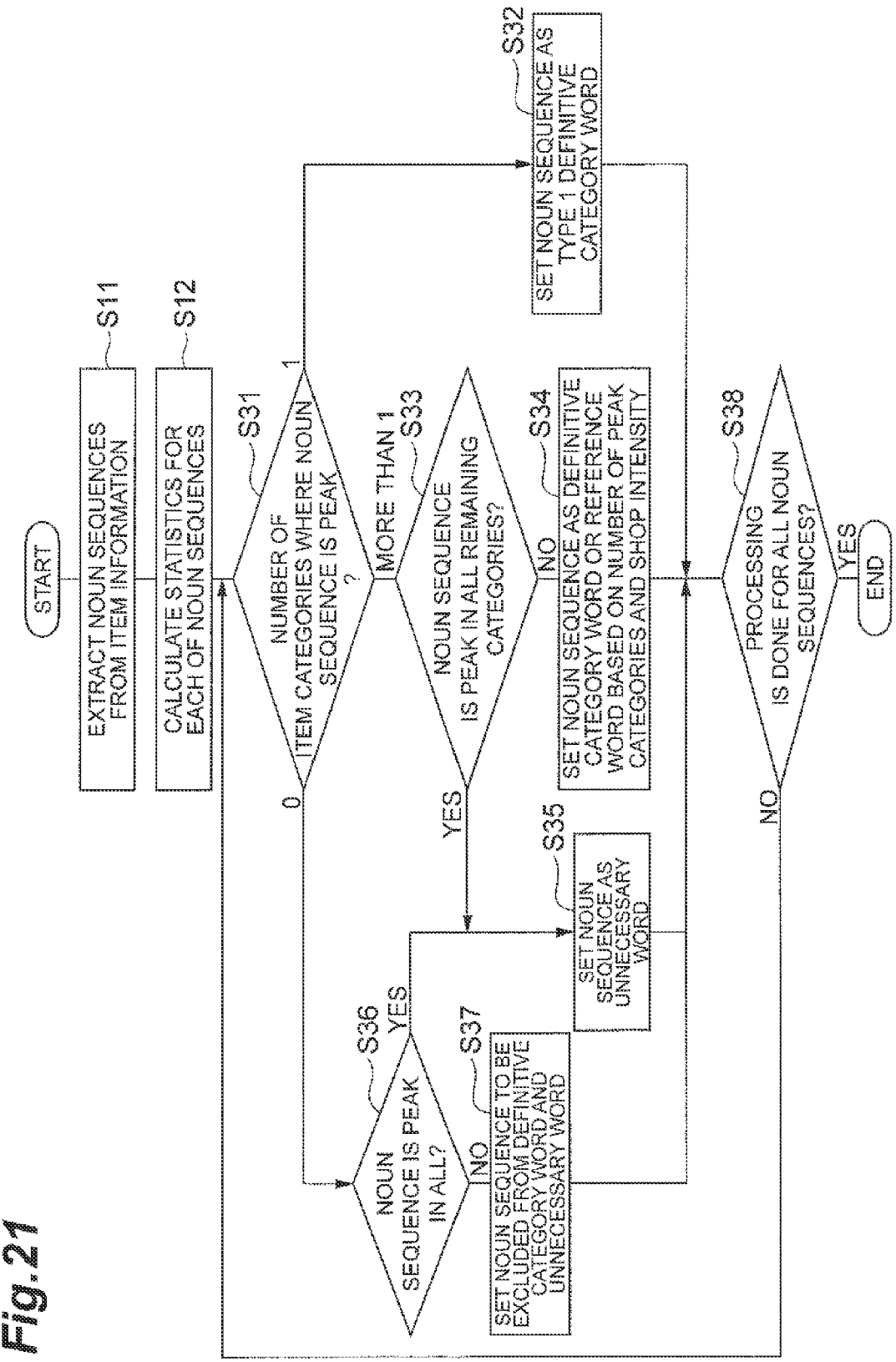
FIG. 21 is a flowchart showing an operation of the dictionary generation server according to the seventh embodiment.

The function and operation of the determination unit 13A are described with reference to FIG. 21. As in the first embodiment, after the processing in Steps S11 and S12, the determination unit 13A performs processing for each noun sequence.

The determination unit 13A determines whether one noun sequence reaches a peak in one or more item categories using the condition 2 (Step S31). When the noun sequence reaches a peak in one item category only ("1" in Step S31), the determination unit 13A determines that the noun sequence is the Type 1 definitive category word in the item category (Step S32). Then, the registration unit 14 generates dictionary information by associating the noun sequence, the item category and the type, and stores the dictionary information into the dictionary database 23 (Step S32). Note that the type is any one of the Type 1 definitive category word, the Type 2 definitive category word, the reference word and the unnecessary word.

When the noun sequence reaches a peak in a plurality of item categories ("more than 1" in Step S31), the determination unit 13A determines the plurality of item categories as peak categories and further determines whether the noun sequence is a peak in the rest of categories excluding the peak categories (Step S33). For this determination, the determination unit 13A uses an additional condition "MpF>Threshold THx". MpF can be obtained by the following equation. THx (second threshold) can be defined by an arbitrary rule.

$$MpF = MF - (\text{Total } CMF \text{ of each peak category})$$

When the noun sequence is not a peak in the rest of categories as a whole (that is, when MpF≤THx) (NO in Step S33), the determination unit 13A sets the type based on the number of item categories (which is also referred to hereinafter as "peak category") where the noun sequence is at its peak and the shop intensity (CMF/MF) in each peak category (Step S34). In this Step S34, the noun sequence is classified as the Type 2 definitive category word or the reference word. Then, the registration unit 14 generates the dictionary information by associating the noun sequence, the item category and the type, and stores the dictionary information into the dictionary database 23 (Step S34).

A method of determining the type is not particularly limited. For example, when the number of peak categories is less than a threshold (for example, 3 or 5) and the shop intensity in each peak category is the same, the determination unit 13A can determine that the noun sequence is the Type 2 definitive category word in each peak category. Further, when the number of peak categories is equal to or more than the threshold and the shop intensity (CMF/MF) in each peak category is the same, the determination unit 13A can determine that the noun sequence is the reference word in each peak category.

Alternatively, the determination unit 13A can determine that the noun sequence is the Type 2 definitive category word in the peak category where the shop intensity (CMF/MF) is the highest and determines that the noun sequence is the reference word in the other peak categories.

Alternatively, the determination unit 13A further uses a threshold THy (THy>THb) for distinguishing between the Type 2 definitive category word and the reference word. Then, when the shop intensity (CMF/MF) in a certain peak category is higher than the threshold THy, the determination unit 13A may determine that the noun sequence is the Type 2 definitive category word in the peak category, and when the shop intensity is equal to or lower than the threshold THy, the determination unit 13A may determine that the noun sequence is the reference word in the peak category.

In the case where the noun sequence is a peak in the rest of categories as a whole (i.e. MpF>THx) (YES in Step S33), the determination unit 13A determines that the noun sequence is the unnecessary word (Step S35). Then, the registration unit 14 generates the dictionary information by associating the noun sequence, the item category and the type, and stores the dictionary information into the dictionary database 23 (Step S35).

In the case where the noun sequence does not reach a peak in any item category (0 in Step S31), the determination unit 13A determines whether the noun sequence is a peak in all (Step S36). When the noun sequence is a peak in all (YES in Step S36), the determination unit 13A determines that the noun sequence is the unnecessary word, and the registration unit 14 stores the noun sequence as the unnecessary word into the dictionary database 23 (Step S35). On the other hand, when the noun sequence is not a peak in all (NO in Step S36), the determination unit 13A excludes the noun sequence from the generation of dictionary information (Step S37).

The processing of Steps S31 to S37 by the determination unit 13A and the registration unit 14 is performed for all of the noun sequences extracted from one item information (cf. Step S38).

As described above, when a certain noun sequence is a peak in a certain category only, the noun sequence is registered as the Type 1 definitive category word, the Type 2 definitive category word or the reference word in that category. On the other hand, when a certain noun sequence is a peak in all item categories, the noun sequence is not registered as the Type 1 definitive category word, the Type 2 definitive category word or the reference word in that category.

The dictionary information that is stored in the dictionary database 23 in this embodiment is information indicating in which item category each word (noun sequence) is set as the Type 1 definitive category word, the Type 2 definitive category word, the reference word or the unnecessary word. FIG. 22 shows an example of the dictionary information.

In the seventh embodiment also, the same advantages as in the first embodiment can be obtained. In addition, because a noun sequence can be classified into four types: the Type 1 and Type 2 definitive category words, the reference word and the unnecessary word, in this embodiment, it is possible to generate more detailed dictionary information.

In this embodiment, the unnecessary words may be stored in an unnecessary words dictionary, separately from the dictionary database 23. Further, the registration of the unnecessary words can be omitted and, in this case, the processing in the above Steps S33, S35 and S36 is omitted.

Embodiments of the present invention are described in detail above. However, the present invention is not limited to the above-described embodiments. Various changes and modifications may be made to the present invention without departing from the scope of the invention.

In order to accommodate notational variants of words (which means that there are variations in notation for one word), a database (notation dictionary) that stores information about notational variants may be used. For example, the English word "interface" is written in Japanese as "intafesu", "inta-feisu" and the like, which are notational variants. In light of this, the extraction unit, the calculation unit and the (first and second) determination unit may perform processing after accommodating notational variants of noun sequences by reference to the notation dictionary. Further, the registration unit may register the dictionary information that contains not only the noun sequences recognized as the definitive category words but also notational variants of those noun sequences into the dictionary database 23. The notational variants can be thereby accommodated.

Although the noun sequence that is not recognized as the definitive category word is rejected in the first and fourth embodiments, the registration unit 14 may register a plurality of item categories corresponding to the noun sequence as recommended categories into another database (recommendation dictionary) different from the definitive category words dictionary. In this case, the recommendation information is information in which the noun sequence and the item categories are associated, and a plurality of records are generated for one noun sequence. With such recommendation information, it is possible to increase the choice of the item categories. For example, by presenting the recommendation dictionary when an item is registered at a shop, it is possible to save the shop time and trouble to select an item category.

Although the dictionary generation server is separated from the EC server in each of the above-described embodiments, those two servers may be combined together.

From the above description, the present invention can be defined as the following notes.

A dictionary generation device comprising:

an extraction unit configured to extract a noun or a sequence of nouns as a noun sequence from an item name of item information read from an item database, the item information containing the item name, an item category and a shop selling the item;

a calculation unit configured to specify one or more item categories indicated by item information where the noun sequence is included in the item name by reference to the item database, and calculate the number of shops by which the item category has been indicated for each of the specified item categories;

a determination unit configured to calculate a shop intensity for each of the specified item categories based on the number of shops, determine whether one item category uniquely derived from the noun sequence exists based on the shop intensity for each item category, and determine the noun sequence as a definitive category word when the one item category exists; and a registration unit configured to store dictionary information where the definitive category word and the uniquely derived item category are associated with each other into a dictionary database.

The dictionary generation device according to Note 1, wherein the calculation unit calculates the number of appearances of the noun sequence for each of the specified item categories, and the determination unit calculates a noun sequence intensity for each of the specified item categories based on the number of appearances, and determines whether one item category uniquely derived from the noun sequence exists based on the shop intensity and the noun sequence intensity for each item category.

The dictionary generation device according to Note 1, wherein the calculation unit calculates the number of items corresponding to each of the specified item categories, and the determination unit calculates an item intensity for each of the specified item categories based on the number of items, and determines whether one item category uniquely derived from the noun sequence exists based on the shop intensity and the item intensity for each item category.

The dictionary generation device according to any one of Notes 1 to 3, wherein the calculation unit calculates a total number of shops having registered item information where the item name includes the noun sequence, and when the total number of shops is equal to or less than a specified threshold, the determination unit does not determine the noun sequence as the definitive category word.

The dictionary generation device according to any one of Notes 1 to 4, wherein the determination unit refers to an unnecessary words dictionary that stores unnecessary words, and when the noun sequence coincides with the unnecessary word, does not determine the noun sequence as the definitive category word.

The dictionary generation device according to any one of Notes 1 to 5, wherein the determination unit specifies an item category with the highest shop intensity as a major category and specifies an item category with a lower shop intensity than the major category as a minor category, calculates an overlap degree of words between item names of the minor category and item names of the major category, and when the overlap degree is equal to or higher than a specified threshold, determines that the major category is the item category uniquely derived from the noun sequence.

The dictionary generation device according to Note 6, wherein when the overlap degree is equal to or higher than the specified threshold in N-th hierarchical level of the major category and the minor category, the determination unit determines that the N-th hierarchical level of the major category is uniquely derived from the noun sequence, and then repeats the specification of the major category and the minor category, the calculation of the overlap degree and the determination based on the overlap degree in (N+1)th hierarchical level of the major category, where N is 1 or more.

The dictionary generation device according to any one of Notes 1 to 7, further comprising:

an update unit configured to update an item category in the item information where an item name includes the definitive category word indicated by the dictionary information to an item category indicated by the dictionary information, wherein after the item information is updated by the update unit, processing by the extraction unit, the calculation unit, the determination unit, the registration unit and the update unit is performed repeatedly, and the determination unit determines whether one item category uniquely derived from the noun sequence exists based on the shop intensity by setting a threshold for the shop intensity to be lower than a value used in the previous determination.

The dictionary generation device according to any one of Notes 1 to 8, wherein the extraction unit extracts the noun sequence from the item name by morphological analysis.

The dictionary generation device according to any one of Notes 1 to 8, wherein the extraction unit extracts the noun sequence from the item name by reference to a rule dictionary that stores a description rule of item names indicating an extraction range of the noun sequence.

The dictionary generation device according to any one of Notes 1 to 8, wherein the extraction unit extracts words different from unnecessary words from the item name by reference to an unnecessary words dictionary that stores unnecessary words, and extracts the noun sequence from the extracted words.

The dictionary generation device according to any one of Notes 1 to 11, wherein the registration unit stores recommendation information where the noun sequence and an item category different from the uniquely derived item category among the specified item categories are associated with each other into another dictionary database.

The dictionary generation device according to any one of Notes 1 to 12, wherein the determination unit determines whether one item category uniquely derived from a pair of the noun sequence and a shop or a shop category exists based on the shop intensity for each item category, and determines the noun sequence as the definitive category word when the one item category exists, and the registration unit stores dictionary information where the definitive category word, the shop or the shop category and the uniquely derived item category are associated with one another into the dictionary database.

The dictionary generation device according to any one of Notes 1 to 13, wherein the extraction unit extracts the noun sequence from the item name by reference to a notation dictionary that stores information about notational variants.

The dictionary generation device according to any one of Notes 1 to 14, wherein the registration unit extracts a word corresponding to the definitive category word by reference to a notation dictionary that stores information about notational variants, and stores dictionary information where the definitive category word, the corresponding word and the uniquely derived item category are associated with one another into the dictionary database.

The dictionary generation device according to Note 1, wherein when there is only one item category where the shop intensity is higher than a first threshold, the determination unit determines that one item category uniquely derived from the noun sequence exists and determines the noun sequence as a Type 1 definitive category word of the item category, when there are a plurality of item categories where the shop intensity is higher than the first threshold, the determination unit determines the noun sequence as a Type 2 definitive category word with less definitiveness of the item category than the Type 1 definitive category word or a reference word with less definitiveness of the item category than the Type 2 definitive category word for each of the plurality of item categories, and the registration unit stores dictionary information where the Type 1 definitive category word, the Type 2 definitive category word or the reference word and the item category are associated with each other into the dictionary database.

The dictionary generation device according to Note 16, wherein when the number of item categories where the shop intensity is higher than the first threshold is not 1, the determination unit determines whether the number of registration shops of the noun sequence in remaining categories excluding the item category is larger than a second threshold, and when the number of registration shops is larger than the second threshold, the determination unit determines the noun sequence as an unnecessary word, and the registration unit stores the unnecessary word into a specified database.

A dictionary generation method performed by a dictionary generation device, the method comprising:

an extraction step of extracting a noun or a sequence of nouns as a noun sequence from an item name of item information read from an item database, the item information containing the item name, an item category and a shop selling the item;

a calculation step of specifying one or more item categories indicated by item information where the noun sequence is included in the item name by reference to the item database, and calculating the number of shops by which the item category has been indicated for each of the specified item categories;

a determination step of calculating a shop intensity for each of the specified item categories based on the number of shops, determining whether one item category uniquely derived from the noun sequence exists based on the shop intensity for each item category, and determining the noun sequence as a definitive category word when the one item category exists; and a registration step of storing dictionary information where the definitive category word and the uniquely derived item category are associated with each other into a dictionary database.

A dictionary generation program causing a computer to implement:

an extraction unit configured to extract a noun or a sequence of nouns as a noun sequence from an item name of item information read from an item database, the item information containing the item name, an item category and a shop selling the item;

a calculation unit configured to specify one or more item categories indicated by item information where the noun sequence is included in the item name by reference to the item database, and calculate the number of shops by which the item category has been indicated for each of the specified item categories;

a determination unit configured to calculate a shop intensity for each of the specified item categories based on the number of shops, determine whether one item category uniquely derived from the noun sequence exists based on the shop intensity for each item category, and determine the noun sequence as a definitive category word when the one item category exists; and a registration unit configured to store dictionary information where the definitive category word and the uniquely derived item category are associated with each other into a dictionary database.

A computer-readable recording medium storing a dictionary generation program causing a computer to implement:

an extraction unit configured to extract a noun or a sequence of nouns as a noun sequence from an item name of item information read from an item database, the item information containing the item name, an item category and a shop selling the item;

a calculation unit configured to specify one or more item categories indicated by item information where the noun sequence is included in the item name by reference to the item database, and calculate the number of shops by which the item category has been indicated for each of the specified item categories;

a determination unit configured to calculate a shop intensity for each of the specified item categories based on the number of shops, determine whether one item category uniquely derived from the noun sequence exists based on the shop intensity for each item category, and determine the noun sequence as a definitive category word when the one item category exists; and a registration unit configured to store dictionary information where the definitive category word and the uniquely derived item category are associated with each other into a dictionary database.

REFERENCE SIGNS LIST 10,10A . . . dictionary generation server, 11 . . . extraction unit, 12 . . . calculation unit, 13,13A . . . determination unit, 14 . . . registration unit, 15 . . . update unit, 20 . . . databases, 21 . . . shop database, 22 . . . item database, 23 . . . dictionary database, 30 . . . dictionary generation server, 31 . . . extraction unit, 32 . . . calculation unit, 33 . . . first determination unit, 34 . . . second determination unit, 35 . . . registration unit, 36 . . . update unit, 90 . . . EC server, P1 . . . dictionary generation program, P10 . . . main module, P11 . . . extraction module, P12 . . . calculation module, P13 . . . determination module, P14 . . . registration module, P15 . . . update module, P2 . . . dictionary generation program, P20 . . . main module, P21 . . . extraction module, P22 . . . calculation module, P23 . . . determination module, P24 . . . determination module, P25 . . . registration module, P26 . . . update module, Ts . . . shop terminal, Tu . . . user terminal

The invention claimed is:

1. A dictionary generation device comprising:
a determination unit configured to (A) refer to an item database that stores a plurality of records containing an item name and/or item description including a noun, a noun phrase or a noun sequence being a sequence of nouns or noun phrases, an item category, and a shop selling the item as fields and determine whether the noun sequence included in the item name and/or item description of each record is set corresponding to the item category, (B) count the number of selling shops in a record containing the noun sequence set corresponding to the item category for each item category and calculate a shop intensity of each noun sequence set corresponding to the item category based on the counted number of selling shops, (C) determine whether one item category uniquely derived from the noun sequence exists based on the shop intensity for each item category, and (D) determine the noun sequence as a definitive category word when the one item category exists; and
a registration unit configured to store dictionary information where the definitive category word and the uniquely derived item category are associated with each other into a dictionary database.

2. The dictionary generation device according to claim 1, wherein
the determination unit calculates the number of appearances of the noun sequence for each item category, calculates a noun sequence intensity for each item category based on the number of appearances, and determines whether one item category uniquely derived from the noun sequence exists based on the shop intensity and the noun sequence intensity for each item category.

3. The dictionary generation device according to claim 1, wherein
the determination unit calculates the number of items corresponding to each item category, calculates an item intensity for each item category based on the number of items, and determines whether one item category uniquely derived from the noun sequence exists based on the shop intensity and the item intensity for each item category.

4. The dictionary generation device according to claim 1, wherein
the determination unit calculates a total number of shops having registered item information where the item name includes the noun sequence, and when the total number of shops is equal to or less than a specified threshold, does not determine the noun sequence as the definitive category word.

5. The dictionary generation device according to claim 1, wherein
the determination unit refers to an unnecessary words dictionary that stores unnecessary words, and when the noun sequence coincides with the unnecessary word, does not determine the noun sequence as the definitive category word.

6. The dictionary generation device according to claim 1, wherein
the determination unit specifies an item category with the highest shop intensity as a major category and specifies an item category with a lower shop intensity than the major category as a minor category, calculates an overlap degree of words between item names of the minor category and item names of the major category, and when the overlap degree is equal to or higher than a specified threshold, determines that the major category is the item category uniquely derived from the noun sequence.

7. The dictionary generation device according to claim 6, wherein
when the overlap degree is equal to or higher than the specified threshold in N-th hierarchical level of the major category and the minor category, the determination unit determines that the N-th hierarchical level of the major category is uniquely derived from the noun sequence, and then repeats the specification of the major category and the minor category, the calculation of the overlap degree and the determination based on the overlap degree in (N+1)th hierarchical level of the major category, where N is 1 or more.

8. The dictionary generation device according to claim 1, further comprising:
an update unit configured to update an item category in the item information where an item name includes the definitive category word indicated by the dictionary information to an item category indicated by the dictionary information, wherein after the item information is updated by the update unit, processing by the determination unit, the registration unit and the update unit is performed repeatedly, and
the determination unit determines whether one item category uniquely derived from the noun sequence exists based on the shop intensity by setting a threshold for the shop intensity to be lower than a value used in the previous determination.

9. The dictionary generation device according to claim 1, wherein
the determination unit extracts the noun sequence from the item name by morphological analysis.

10. The dictionary generation device according to claim 1, wherein
the determination unit extracts the noun sequence from the item name by reference to a rule dictionary that stores a description rule of item names indicating an extraction range of the noun sequence.

11. The dictionary generation device according to claim 1, wherein
the determination unit extracts words different from unnecessary words from the item name by reference to an unnecessary words dictionary that stores unnecessary words, and extracts the noun sequence from the extracted words.

12. The dictionary generation device according to claim 1, wherein
the registration unit stores recommendation information where the noun sequence and an item category different from the uniquely derived item category among the item categories are associated with each other into another dictionary database.

13. The dictionary generation device according to claim 1, wherein
the determination unit determines whether one item category uniquely derived from a pair of the noun sequence and a shop or a shop category exists based on the shop intensity for each item category, and determines the noun sequence as the definitive category word when the one item category exists, and
the registration unit stores dictionary information where the definitive category word, the shop or the shop category and the uniquely derived item category are associated with one another into the dictionary database.

14. The dictionary generation device according to claim 1, wherein
the determination unit extracts the noun sequence from the item name by reference to a notation dictionary that stores information about notational variants.

15. The dictionary generation device according to claim 1, wherein
the registration unit extracts a word corresponding to the definitive category word by reference to a notation dictionary that stores information about notational variants, and stores dictionary information where the definitive category word, the corresponding word and the uniquely derived item category are associated with one another into the dictionary database.

16. The dictionary generation device according to claim 1, wherein
when there is only one item category where the shop intensity is higher than a first threshold, the determination unit determines that one item category uniquely derived from the noun sequence exists and determines the noun sequence as a Type 1 definitive category word of the item category, when there are a plurality of item categories where the shop intensity is higher than the first threshold, the determination unit determines the noun sequence as a Type 2 definitive category word with less definitiveness of the item category than the Type 1 definitive category word or a reference word with less definitiveness of the item category than the Type 2 definitive category word for each of the plurality of item categories, and the registration unit stores dictionary information where the Type 1 definitive category word, the Type 2 definitive category word or the reference word and the item category are associated with each other into the dictionary database.

17. The dictionary generation device according to claim 16, wherein when the number of item categories where the shop intensity is higher than the first threshold is not 1, the determination unit determines whether the number of registration shops of the noun sequence in remaining categories excluding the item category is larger than a second threshold, and when the number of registration shops is larger than the second threshold, the determination unit determines the noun sequence as an unnecessary word, and the registration unit stores the unnecessary word into a specified database.

18. A dictionary generation method performed by a dictionary generation device, the method comprising:

a determination step of (A) referring to an item database that stores a plurality of records containing an item name and/or item description including a noun, a noun phrase or a noun sequence being a sequence of nouns or noun phrases, an item category, and a shop selling the item as fields and determining whether the noun sequence included in the item name and/or item description of each record is set corresponding to the item category, (B) counting the number of selling shops in a record containing the noun sequence set corresponding to the item category for each item category and calculating a shop intensity of each noun sequence set corresponding to the item category based on the counted number of selling shops, (C) determining whether one item category uniquely derived from the noun sequence exists based on the shop intensity for each item category, and (D) determining the noun sequence as a definitive category word when the one item category exists; and a registration step of storing dictionary information where the definitive category word and the uniquely derived item category are associated with each other into a dictionary database.

19. A non-transitory computer-readable recording medium storing a dictionary generation program causing a computer to implement:

a determination unit configured to (A) refer to an item database that stores a plurality of records containing an item name and/or item description including a noun, a noun phrase or a noun sequence being a sequence of nouns or noun phrases, an item category, and a shop selling the item as fields and determine whether the noun sequence included in the item name and/or item description of each record is set corresponding to the item category, (B) count the number of selling shops in a record containing the noun sequence set corresponding to the item category for each item category and calculate a shop intensity of each noun sequence set corresponding to the item category based on the counted number of selling shops, (C) determine whether one item category uniquely derived from the noun sequence exists based on the shop intensity for each item category, and (D) determine the noun sequence as a definitive category word when the one item category exists; and a registration unit configured to store dictionary information where the definitive category word and the uniquely derived item category are associated with each other into a dictionary database.

* * * * *